US012778206B2

(12) United States Patent
Sheridan

(10) Patent No.: US 12,778,206 B2
(45) Date of Patent: Nov. 3, 2026

(54) DELIVERY SYSTEM

(71) Applicant: Nicoventures Trading Limited, London (GB)

(72) Inventor: James Sheridan, London (GB)

(73) Assignee: Nicoventures Trading Limited, London (GB)

( * ) Notice: Subject to any disclaimer, the term of this patent is extended or adjusted under 35 U.S.C. 154(b) by 447 days.

(21) Appl. No.: 18/553,318

(22) PCT Filed: Mar. 30, 2022

(86) PCT No.: PCT/GB2022/050793
§ 371 (c)(1),
(2) Date: Sep. 29, 2023

(87) PCT Pub. No.: WO2022/208077
PCT Pub. Date: Oct. 6, 2022

(65) Prior Publication Data

US 2024/0180253 A1 Jun. 6, 2024

(30) Foreign Application Priority Data

Mar. 31, 2021 (GB) ..................................... 2104583
Mar. 31, 2021 (GB) ..................................... 2104588
Dec. 22, 2021 (GB) ..................................... 2118848

(51) Int. Cl.
*A24F 40/485* (2020.01)
*A24F 40/46* (2020.01)
*H05B 3/00* (2006.01)

(52) U.S. Cl.
CPC ............ *A24F 40/485* (2020.01); *A24F 40/46* (2020.01); *H05B 3/0019* (2013.01); *H05B 2203/021* (2013.01)

(58) Field of Classification Search
CPC .......... A24F 40/40; A24F 40/42; A24F 40/46; A24F 40/485
See application file for complete search history.

(56) References Cited

U.S. PATENT DOCUMENTS 9,521,867 B2 12/2016 Xiang
10,058,124 B2 8/2018 Monsees et al.
(Continued)

FOREIGN PATENT DOCUMENTS

CN 205161897 U 4/2016
CN 108576938 A 9/2018
(Continued)

OTHER PUBLICATIONS

CN112237298A_Espacenet_Translation (Year: 2021).*
(Continued)

*Primary Examiner* — Christopher M Rodd
*Assistant Examiner* — Ronnie Kirby Jordan
(74) *Attorney, Agent, or Firm* — MERCHANT & GOULD P.C.

(57) ABSTRACT

An article for use as part of a non-combustible aerosol provision system, the article including a housing and a substantially planar aerosol generating component, wherein the housing includes a plurality of air inlets disposed within a first plane at a first end, wherein the aerosol generating component forms a second plane, wherein the plurality of inlets are entirely within the perimeter defined by the aerosol generating component when viewed along an axis perpendicular to the first plane.

17 Claims, 15 Drawing Sheets

(56) References Cited

U.S. PATENT DOCUMENTS

| | | | | |
|---|---|---|---|---|
| 10,076,139 | B2 | 9/2018 | Monsees et al. | |
| 10,750,784 | B2 | 8/2020 | Mironov et al. | |
| 2015/0027456 | A1 | 1/2015 | Janardhan et al. | |
| 2019/0335819 | A1 | 11/2019 | Watanabe | |
| 2020/0008470 | A1 | 1/2020 | Reevell | |
| 2020/0107572 | A1 | 4/2020 | Marques Borges et al. | |
| 2020/0113242 | A1 | 4/2020 | Novak, III et al. | |
| 2021/0045456 | A1 * | 2/2021 | Weigensberg et al. | A24F 40/10 |
| 2022/0211114 | A1 * | 7/2022 | Fraser et al. | A24F 40/40 |
| 2022/0225669 | A1 * | 7/2022 | Hawes et al. | A34F 40/40 |
| 2023/0309627 | A1 * | 10/2023 | Wen et al. | A24F 40/40 131/329 |

FOREIGN PATENT DOCUMENTS

| | | | | |
|---|---|---|---|---|
| CN | 208228320 | U | 12/2018 | |
| CN | 109938409 | A | 6/2019 | |
| CN | 110051045 | A | 7/2019 | |
| CN | 209463298 | U | 10/2019 | |
| CN | 111567889 | A | 8/2020 | |
| CN | 111820472 | A | 10/2020 | |
| CN | 112237298 | A * | 1/2021 | A24F 40/10 |
| CN | 113491355 | A | 10/2021 | |
| EP | 3232841 | B1 | 3/2020 | |
| EP | 3616538 | | 3/2020 | |
| WO | 2010045670 | A1 | 4/2010 | |
| WO | 2010045671 | A1 | 4/2010 | |
| WO | 2018211252 | A1 | 11/2018 | |
| WO | 2019122878 | A1 | 6/2019 | |
| WO | 2019149424 | | 8/2019 | |
| WO | 2020002671 | A1 | 1/2020 | |
| WO | 2020115306 | A1 | 6/2020 | |

OTHER PUBLICATIONS

Korean Notice of Allowance for Application No. 10-2023-4033354, dated Nov. 6, 2025, 4 pages (1 English Translation, 3 Original).

"International Search Report and Written Opinion received for PCT Patent Application No. PCT/GB2022/050793, mailed on Jul. 21, 2022", 14 pages.

Office Action received for Chinese Patent Application No. 202280026584.2, mailed on Apr. 17, 2026, 17 pages (8 pages of English Translation and 9 pages of Official Copy).

* cited by examiner

DELIVERY SYSTEM

PRIORITY CLAIM

The present application is a National Phase entry of PCT Application No. PCT/GB2022/050793, filed Mar. 30, 2022, which claims priority from GB Application No. 2104583.6, filed Mar. 31, 2021, GB Application No. 2104588.5, filed Mar. 31, 2021 and GB Application No. 2118848.7, filed Dec. 22, 2021, each of which hereby fully incorporated herein by reference.

TECHNICAL FIELD

The present disclosure relates to a delivery system, in particular to a non-combustible aerosol delivery system and to components of said aerosol delivery system. The present disclosure further relates to methods of generating and delivering an aerosol using the non-combustible aerosol delivery system and components disclosed herein.

BACKGROUND

Non-combustible aerosol delivery systems which generate an aerosol for inhalation by a user are known in the art. Such systems typically comprise an aerosol generator which is capable of converting an aerosolizable material into an aerosol. In some instances, the aerosol generated is a condensation aerosol whereby an aerosolizable material is first vaporized and then allowed to condense into an aerosol. In other instances, the aerosol generated is an aerosol which results from the atomization of the aerosolizable material. Such atomization may be brought about mechanically, e.g. by subjecting the aerosolizable material to vibrations so as to form small particles of material that are entrained in airflow. Alternatively, such atomization may be brought about electrostatically, or in other ways, such as by using pressure etc.

Since such aerosol delivery systems are intended to generate an aerosol which is to be inhaled by a user, consideration should be given to the characteristics of the aerosol produced. These characteristics can include the size of the particles of the aerosol, the total amount of the aerosol produced, etc.

Moreover, since such aerosol delivery systems typically contain a storage area for the aerosolizable material, consideration should be given as to how the aerosolizable material can be suitably stored.

Further, due to the popularity of such aerosol delivery systems, it is becoming increasingly important to be able to manufacture such systems in an efficient manner. Additionally, the systems should be robust so as to allow for multiple uses as may be required.

It would be desirable to provide aerosol delivery systems which have improvements relating to one or more of the above aspects of aerosol production, storage of aerosolizable material and manufacture.

SUMMARY

According to a first aspect of the present disclosure, there is provided an article for use as part of a non-combustible aerosol provision system, the article comprising an outer housing component enclosing at least a portion of an inner housing component such that a plurality of discrete airflow channels are provided between the inner and outer housings, each airflow channel extending to a corresponding air outlet in the outer housing.

Each channel may originate from a common aerosol generating chamber.

The inner housing may define a storage area for aerosol forming material to be stored.

Two discrete airflow channels may be provided and each channel may extend longitudinally along the article between the outer housing component and inner housing component.

The outlets may take the form of slots.

The channels may be provided between an inner wall of the outer housing component and an outer wall of the inner housing component.

Each outlet may be fed via a sloped surface.

The sloped surface may be a continuation of the outer wall of the inner housing component.

The gradient of the slope, relative to the plane of the outlet in the outer housing component, may be between 10° and 75°.

The sloped surface may have a curved profile.

The sloped surface may have a convex or concave profile.

The slot length may be greater than 1 mm.

According to a second aspect of the present disclosure, there is provided a non-combustible aerosol provision system comprising an article in accordance with the first aspect and a device comprising a power source and a control unit.

The device and article may be separably connected.

The device and article may be permanently connected.

In some embodiments, the system may comprise an aerosol generating chamber. The article may comprise the aerosol generating chamber. The aerosol generating chamber may be provided within the article. There may be a single aerosol generating chamber. There may be multiple aerosol generating chambers.

In some embodiments, the system may comprise an aerosol generating component. The article may comprise the aerosol generating component. The aerosol generating component may be provided within the article. There may be a single aerosol generating component. There may be multiple aerosol generating components.

It is possible to configure the system such that the airflow channels and/or the aerosol generating chamber(s) and/or the aerosol generating component(s) are separable. For example, the article may be provided in a modular form in which the airflow channels and/or the aerosol generating chamber(s) and/or the aerosol generating component(s) are separable.

According to another aspect of the present disclosure, there is provided an article for use as part of a non-combustible aerosol provision system, the article comprising a housing and a substantially planar aerosol generating component, wherein the housing comprises a plurality of air inlets disposed within a first plane at a first end, wherein the aerosol generating component forms a second plane, wherein the plurality of inlets are entirely within the perimeter defined by the aerosol generating component when viewed along an axis perpendicular to the first plane.

The aerosol generating component may be arranged within the housing.

In some embodiments, the second plane is slightly angled relative to the first plane. For example, the second plane may be angled relative to the first plane by up to 15 degrees, up to 10 degrees, up to 8 degrees, up to 5 degrees, or up to 2 degrees.

In some embodiments, the second plane is substantially parallel to the first plane.

The plurality of inlets may be entirely within the perimeter defined by the aerosol generating component when viewed along an axis perpendicular to the first plane and the second plane.

The first end of the housing may comprise an outer housing component.

The plurality of air inlets may be located in the outer housing component.

Each air inlet may extend from the outside of the article directly into an aerosol generating chamber.

The aerosol generating chamber may be formed by an inwardly facing surface of the outer housing component and a flow component.

The aerosol generating component may be located within the aerosol generating chamber.

There may be two, three, four, five, six, seven or eight air inlets.

The aerosol generating component may be an electrically resistive heater.

The heater may comprise a heated section defined by a temperature perimeter of within 10% of the part of the heater with the highest temperature.

The heated section may comprise multiple parallel filament sections which are separated by corresponding parallel spaces.

The airflow inlets may be located within the perimeter of the heated section.

When there are between two and six air inlets, they may be configured as would be found on a dice.

Each air inlet may have an opening, a neck section and an outlet.

The opening and outlet of each individual air inlet may be the same shape as another individual air inlet.

The opening and outlet of each individual air inlet may be of a different shape as another individual air inlet.

The opening and outlet of each individual air inlet may have the same dimensions as another individual air inlet.

The opening and outlet of each individual air inlet may have different dimensions compared to another individual air inlet.

The housing may define a longitudinal axis. The longitudinal axis of the housing is an axis through the length of the housing. The first plane and/or the second plane may be substantially perpendicular to the longitudinal axis of the housing.

According to another aspect of the present disclosure, there is provided a non-combustible aerosol provision system comprising an article in accordance with an aspect of the present disclosure and a device comprising a power source and a control unit.

The device and the article may be separably connected.

The device and article may be permanently connected.

In some embodiments, the system may comprise an aerosol generating chamber. The article may comprise the aerosol generating chamber. The aerosol generating chamber may be provided within the article. There may be a single aerosol generating chamber. There may be multiple aerosol generating chambers.

There may be a single aerosol generating component. There may be multiple aerosol generating components.

It will be appreciated that features and aspects of the disclosure described above in relation to the first and other aspects of the disclosure are equally applicable to, and may be combined with, embodiments of the disclosure according to other aspects of the disclosure as appropriate, and not just in the specific combinations described above.

BRIEF DESCRIPTION OF THE DRAWINGS

Various embodiments will now be described in detail by way of example only with reference to the accompanying drawings in which.

DETAILED DESCRIPTION

Figure 1:
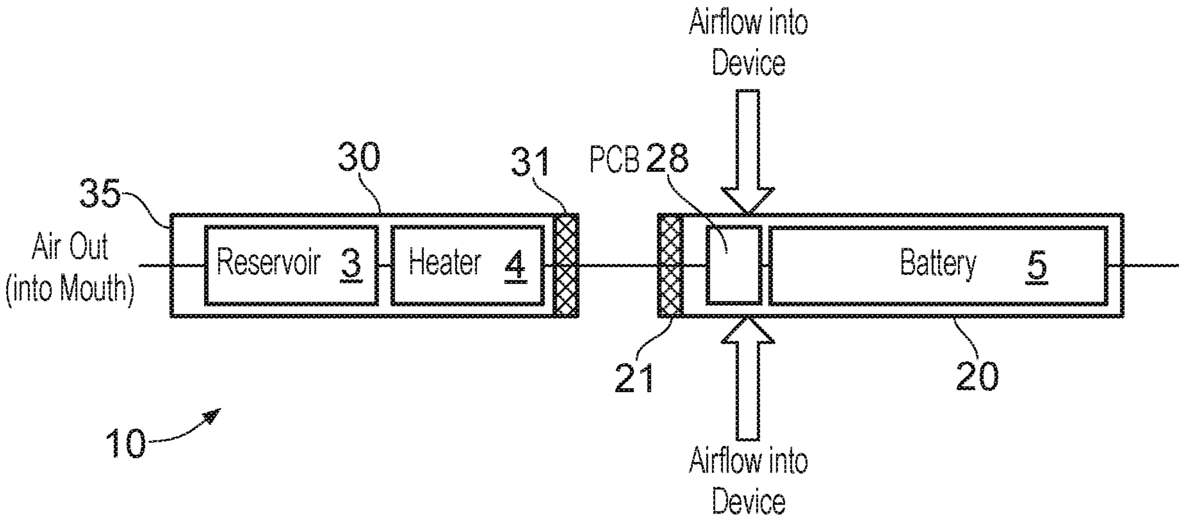
FIG. 1 is a schematic representation of an aerosol provision device according to the present disclosure.

Aspects and features of certain examples and embodiments are discussed/described herein. Some aspects and features of certain examples and embodiments may be implemented conventionally and these are not discussed/ described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) non-combustible aerosol provision systems and devices that generate an aerosol from an aerosol-generating material (or aerosolizable material) without combusting the aerosol-generating material. Examples of such systems include electronic cigarettes, tobacco heating systems, and hybrid systems (which generate aerosol using a combination of aerosol-generating materials). In some examples, the non-combustible aerosol provision system is an electronic cigarette, also known as a vaping device or electronic nicotine delivery system (END), although it is noted that the presence of nicotine in the aerosol-generating material is not a requirement of the present disclosure. In some examples, the non-combustible aerosol provision system is an aerosol-generating material heating system, also known as a heat-not-burn system. An example of such a system is a tobacco heating system. In some examples, the non-combustible aerosol provision system is a hybrid system to generate aerosol using a combination of aerosol-generating materials, one or a plurality of which may be heated. Each of the aerosol-generating materials in such a hybrid system may be, for example, in the form of a solid, liquid or gel and may or may not contain nicotine. In some examples, the hybrid system comprises a liquid or gel aerosol-generating material and a solid aerosol-generating material. The solid aerosol-generating material may comprise, for example, tobacco or a non-tobacco product.

Throughout the following description the terms "e-cigarette" and "electronic cigarette" may sometimes be used; however, it will be appreciated these terms may be used interchangeably with non-combustible aerosol (vapor) provision system or device as explained above.

In some examples, the present disclosure relates to consumables for holding aerosol-generating material, and which are configured to be used with non-combustible aerosol provision devices. These consumables are sometimes referred to as articles throughout the present disclosure.

The non-combustible aerosol provision system typically comprises a device part and a consumable/article part. The device part typically comprises a power source and a controller. The power source may typically be an electrical power source, e.g. a rechargeable battery.

In some examples, the non-combustible aerosol provision system may comprise an area for receiving or engaging with the consumable/article, an aerosol generator (which may or may not be within the consumable/article), an aerosol generation area (which may be within the consumable/article), a housing, a mouthpiece, a filter and/or an aerosol-modifying agent.

In some examples, the consumable/article for use with the non-combustible aerosol provision device may comprise aerosol-generating material, an aerosol-generating material storage area, an aerosol-generating material transfer component, an aerosol generator, an aerosol generation area (or chamber), a housing, a wrapper, a filter, a mouthpiece, and/or an aerosol-modifying agent.

The systems described herein typically generate an inhalable aerosol by vaporization of an aerosol generating material. The aerosol generating material may comprise one or more active constituents, one or more flavors, one or more aerosol-former materials, and/or one or more other functional materials.

Aerosol-generating material may, for example, be in the form of a solid, liquid or gel which may or may not contain an active substance and/or flavorants. In some examples, the aerosol-generating material may comprise an "amorphous solid", which may alternatively be referred to as a "monolithic solid" (i.e. non-fibrous). In some examples, the amorphous solid may be a dried gel. The amorphous solid is a solid material that may retain some fluid, such as liquid, within it. In some examples, the aerosol-generating material may for example comprise from about 50 wt %, 60 wt % or 70 wt % of amorphous solid, to about 90 wt %, 95 wt % or 100 wt % of amorphous solid.

The term "active substance" as used herein may relate to a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical.

The aerosol-former material may comprise one or more constituents capable of forming an aerosol. In some examples, the aerosol-former material may comprise one or more of glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional materials may comprise one or more of pH regulators, coloring agents, preservatives, binders, fillers, stabilizers, and/or antioxidants.

As used herein, the term "component" is used to refer to a part, section, unit, module, assembly or similar of an electronic cigarette or similar device that incorporates several smaller parts or elements, possibly within an exterior housing or wall. An electronic cigarette may be formed or built from one or more such components, and the components may be removably or separably connectable to one another, or may be permanently joined together during manufacture to define the whole electronic cigarette. The present disclosure is applicable to (but not limited to) systems comprising two components separably connectable to one another and configured, for example, as a consumable/article component capable of holding an aerosol generating material (also referred to herein as a cartridge or cartomizer), and a device/control unit having a battery for providing electrical power to operate an element for generating vapor from the aerosol generating material.

FIG. 1 is a highly schematic diagram (not to scale) of an example aerosol/vapor provision system such as an e-cigarette 10. The e-cigarette 10 has a generally cylindrical shape, extending along a longitudinal axis indicated by a dashed line, and comprises two main components, namely a control or power component or section 20 and a cartridge assembly or section 30 (sometimes referred to as an article, consumable, cartomizer, or cartridge) that operates as a vapor generating component.

The cartridge assembly 30 includes a storage compartment 3 containing an aerosolizable material comprising (for example) a liquid formulation from which an aerosol is to be generated, for example containing nicotine. As an example, the aerosolizable material may comprise around 1 to 3% nicotine and 50% glycerol, with the remainder comprising roughly propylene glycol, and possibly also comprising other components, such as water or flavorings. The storage compartment 3 has the form of a storage tank, being a container or receptacle in which aerosolizable material can be stored such that the aerosolizable material is free to move and flow (if liquid) within the confines of the tank. Alternatively, the storage compartment 3 may contain a quantity of absorbent material such as cotton wadding or glass fiber which holds the aerosolizable material within a porous structure. The storage compartment 3 may be sealed after filling during manufacture so as to be disposable after the aerosolizable material is consumed, or may have an inlet port or other opening through which new aerosolizable material can be added. The cartridge assembly 30 also comprises an electrical aerosol generating component 4 located externally of the reservoir tank 3 for generating the aerosol by vaporization of the aerosolizable material. In many devices, the aerosol generating component may be a heating element (heater) which is heated by the passage of electrical current (via resistive or inductive heating) to raise the temperature of the aerosolizable material until it evaporates. A liquid conduit arrangement such as a wick or other porous element (not shown) may be provided to deliver aerosolizable material from the storage compartment 3 to the aerosol generating component 4. The wick may have one or more parts located inside the storage compartment 3 so as to be able to absorb aerosolizable material and transfer it by wicking or capillary action to other parts of the wick that are in contact with the vapor generating element 4. This aerosolizable material is thereby vaporized, to be replaced by new aerosolizable material transferred to the vapor generating element 4 by the wick.

A heater and wick combination, or other arrangement of parts that perform the same functions, is sometimes referred to as an atomizer or atomizer assembly. Various designs are possible, in which the parts may be differently arranged compared to the highly schematic representation of FIG. 1. For example, the wick may be an entirely separate element from the aerosol generating component, or the aerosol generating component may be configured to be porous and able to perform the wicking function directly (by taking the form of a suitable electrically resistive mesh or capillary body, for example).

In some cases, the conduit for delivering liquid for vapor generation may be formed at least in part from one or more slots, tubes or channels between the storage compartment and the aerosol generating component which are narrow enough to support capillary action to draw source liquid out of the storage compartment and deliver it for vaporization. In general, an atomizer can be considered to be an aerosol generating component able to generate vapor from aerosolizable material delivered to it, and a liquid conduit (pathway) able to deliver or transport liquid from a storage compartment or similar liquid store to the aerosol generating component by a capillary force.

Typically, the aerosol generating component is at last partly located within an aerosol generating chamber that forms part of an airflow channel through the electronic cigarette/system. Vapor produced by the aerosol generating component is driven off into this chamber, and as air passes through the chamber, flowing over and around the aerosol generating element, it collects the produced vapor whereby it condenses to form the required aerosol.

Returning to FIG. 1, the cartridge assembly 30 also includes a mouthpiece 35 having an opening or air outlet through which a user may inhale the aerosol generated by the aerosol generating component 4, and delivered through the airflow channel.

The power component 20 includes a cell or battery 5 (referred to herein after as a battery, and which may be re-chargeable) to provide power for electrical components of the e-cigarette 10, in particular the aerosol generating component 4. Additionally, there is a printed circuit board 28 and/or other electronics or circuitry for generally controlling the e-cigarette. The control electronics/circuitry connect the vapor generating element 4 to the battery 5 when vapor is required, for example in response to a signal from an air pressure sensor or air flow sensor (not shown) that detects an inhalation on the system 10 during which air enters through one or more air inlets 26 in the wall of the power component 20 to flow along the airflow channel. When the aerosol generating component 4 receives power from the battery 5, the aerosol generating component 4 vaporizes aerosolizable material delivered from the storage compartment 3 to generate the aerosol, and this is then inhaled by a user through the opening in the mouthpiece 35. The aerosol is carried to the mouthpiece 35 along the airflow channel (not shown) that connects the air inlet 26 to the air outlet when a user inhales on the mouthpiece 35. An airflow path through the electronic cigarette is hence defined, between the air inlet(s) (which may or may not be in the power component) to the atomizer and on to the air outlet at the mouthpiece. In use, the air flow direction along this airflow path is from the air inlet to the air outlet, so that the atomizer can be described as lying downstream of the air inlet and upstream of the air outlet.

In this particular example, the power section 20 and the cartridge assembly 30 are separate parts detachable from one another by separation in a direction parallel to the longitudinal axis, as indicated by the solid arrows in FIG. 1. The components 20, 30 are joined together when the device 10 is in use by cooperating engagement elements 21, 31 (for example, a screw, magnetic or bayonet fitting) which provide mechanical and electrical connectivity between the power section 20 and the cartridge assembly 30. This is merely an example arrangement, however, and the various components may be differently distributed between the power section 20 and the cartridge assembly section 30, and other components and elements may be included. The two sections may connect together end-to-end in a longitudinal configuration as in FIG. 1, or in a different configuration such as a parallel, side-by-side arrangement. The system may or may not be generally cylindrical and/or have a generally longitudinal shape. Either or both sections may be intended to be disposed of and replaced when exhausted (the reservoir is empty or the battery is flat, for example), or be intended for multiple uses enabled by actions such as refilling the reservoir, recharging the battery, or replacing the atomizer. Alternatively, the e-cigarette 10 may be a unitary device (disposable or refillable/rechargeable) that cannot be separated into two or more parts, in which case all components are comprised within a single body or housing. Embodiments and examples of the present disclosure are applicable to any of these configurations and other configurations of which the skilled person will be aware.

As mentioned, a type of aerosol generating component, such as a heating element, that may be utilized in an atomizing portion of an electronic cigarette (a part configured to generate vapor from a source liquid) combines the functions of heating and liquid delivery, by being both electrically conductive (resistive) and porous. Note here that reference to being electrically conductive (resistive) refers to components which have the capacity to generate heat in response to the flow of electrical current therein. Such flow could be imparted by via so-called resistive heating or induction heating. An example of a suitable material for this is an electrically conductive material such as a metal or metal alloy formed into a sheet-like form, i.e. a planar shape with a thickness many times smaller than its length or breadth. Examples in this regard may be a mesh, web, grill and the like. The mesh may be formed from metal wires or fibers which are woven together, or alternatively aggregated into a non-woven structure. For example, fibers may be aggregated by sintering, in which heat and/or pressure are applied to a collection of metal fibers to compact them into a single porous mass. It is possible for the planar aerosol generating component to define a curved plane and in these instances reference to the planar aerosol generating component forming a plane means an imaginary flat plane forming a plane of best fit through the component.

These structures can give appropriately sized voids and interstices between the metal fibers to provide a capillary force for wicking liquid. Thus, these structures can also be considered to be porous since they provide for the uptake and distribution of liquid. Moreover, due to the presence of voids and interstices between the metal fibers, it is possible for air to permeate through said structures. Also, the metal is electrically conductive and therefore suitable for resistive heating, whereby electrical current flowing through a material with electrical resistance generates heat. Structures of this type are not limited to metals, however; other conductive materials may be formed into fibers and made into mesh, grill or web structures. Examples include ceramic materials, which may or may not be doped with substances intended to tailor the physical properties of the mesh.

A planar sheet-like porous aerosol generating component of this kind can be arranged within an electronic cigarette such that it lies within the aerosol generating chamber forming part of an airflow channel. The aerosol generating component may be oriented within the chamber such that air flow though the chamber may flow in a surface direction, i.e. substantially parallel to the plane of the generally planar sheet-like aerosol generating component. An example of such a configuration can be found in WO2010/045670 and WO2010/045671, the contents of which are incorporated herein in their entirety by reference. Air can thence flow over the heating element, and gather vapor. Aerosol generation is thereby made very effective. In alternative examples, the aerosol generating component may be oriented within the chamber such that air flow though the chamber may flow in a direction which is substantially transverse to the surface direction, i.e. substantially orthogonally to the plane of the generally planar sheet-like aerosol generating component. An example of such a configuration can be found in WO2018/211252, the contents of which are incorporated herein in its entirety by reference.

The aerosol generating component may have any one of the following structures: a woven or weave structure, mesh structure, fabric structure, open-pored fiber structure, open-pored sintered structure, open-pored foam or open-pored deposition structure. Said structures are suitable in particular for providing a aerosol generating component with a high degree of porosity. A high degree of porosity may ensure that the heat produced by the aerosol generating component is predominately used for evaporating the liquid and high efficiency can be obtained. A porosity of greater than 50% may be envisaged with said structures. In one embodiment, the porosity of the aerosol generating component is 50% or greater, 60% or greater, 70% or greater. The open-pored fiber structure can consist, for example, of a non-woven fabric which can be arbitrarily compacted, and can additionally be sintered in order to improve the cohesion. The open-pored sintered structure can consist, for example, of a granular, fibrous or flocculent sintered composite produced by a film casting process. The open-pored deposition structure can be produced, for example, by a CVD process, PVD process or by flame spraying. Open-pored foams are in principle commercially available and are also obtainable in a thin, fine-pored design.

In one embodiment, the aerosol generating component has at least two layers, wherein the layers contain at least one of the following structures: a plate, foil, paper, mesh, woven structure, fabric, open-pored fiber structure, open-pored sintered structure, open-pored foam or open-pored deposition structure. For example, the aerosol generating component can be formed by an electric heating resistor consisting of a metal foil combined with a structure comprising a capillary structure. Where the aerosol generating component is considered to be formed from a single layer, such a layer may be formed from a metal wire fabric, or from a non-woven metal fiber fabric. Individual layers are advantageously but not necessarily connected to one another by a heat treatment, such as sintering or welding. For example, the aerosol generating component can be designed as a sintered composite consisting of a stainless steel foil and one or more layers of a stainless steel wire fabric (material, for example AISI 304 or AISI 316). Alternatively the aerosol generating component can be designed as a sintered composite consisting of at least two layers of a stainless steel wire fabric. The layers may be connected to one another by spot welding or resistance welding. Individual layers may also be connected to one another mechanically. For instance, a double-layer wire fabric could be produced just by folding a single layer. Instead of stainless steel, use may also be made, by way of example, of heating conductor alloys—in particular NiCr alloys and CrFeAl alloys ("Kanthal") which have an even higher specific electric resistance than stainless steel. The material connection between the layers is obtained by the heat treatment, as a result of which the layers maintain contact with one another-even under adverse conditions, for example during heating by the aerosol generating component and resultantly induced thermal expansions.

Alternatively, the aerosol generating component may be formed from sintering a plurality of individual fibers together. This, the aerosol generating component can be comprised of sintered fibers, such as sintered metal fibers.

The aerosol generating component may comprise, for example, an electrically conductive thin layer of electrically resistive material, such as platinum, nickel, molybdenum, tungsten or tantalum, said thin layer being applied to a surface of the vaporizer by a PVD or CVD process, or any other suitable process. In this case, the aerosol generating component may comprise an electrically insulating material, for example of ceramic. Examples of suitable electrically resistive material include stainless steels, such as AISI 304 or AISI 316, and heating conductor alloys—in particular NiCr alloys and CrFeAl alloys ("Kanthal"), such as DIN material number 2,4658, 2,4867, 2,4869, 2,4872, 1,4843, 1,4860, 1,4725, 1,4765 and 1,4767.

As described above, the aerosol generating component may be formed from a sintered metal fiber material and may be in the form of a sheet. Material of this sort can be thought of a mesh or irregular grid, and is created by sintering together a randomly aligned arrangement or array of spaced apart metal fibers or strands. A single layer of fibers might be used, or several layers, for example up to five layers. As an example, the metal fibers may have a diameter of 8 to 12 μm, arranged to give a sheet of thickness 0.16 mm, and spaced to produce a material density of from 100 $g/m^2$ to 1500 $g/m^2$, such as from 150 $g/m^2$ to 1000 $g/m^2$, 200 $g/m^2$ to 500 $g/m^2$, or 200 to 250 $g/m^2$, and a porosity of 84%. The sheet thickness may also range from 0.1 mm to 0.2 mm, such as 0.1 mm to 0.15 mm. Specific thicknesses include 0.10 mm, 0.11 mm, 0.12 mm, 0.13 mm, 0.14 mm, 0.15 mm or 0.1 mm. Generally, the aerosol generating component has a uniform thickness. However, it will be appreciated from the discussion below that the thickness of the aerosol generating component may also vary. This may be due, for example, to some parts of the aerosol generating component having undergone compression. Different fiber diameters and thicknesses may be selected to vary the porosity of the aerosol generating component. For example, the aerosol generating component may have a porosity of 66% or greater, or 70% or greater, or 75% or greater, or 80% or greater or 85% or greater, or 86% or greater.

The aerosol generating component may form a generally flat structure, comprising first and second surfaces. The generally flat structure may take the form of any two dimensional shape, for example, circular, semi-circular, triangular, square, rectangular and/or polygonal. Generally, the aerosol generating component has a uniform thickness.

A width and/or length of the aerosol generating component may be from about 1 mm to about 50 mm. For example, the width and/or length of the vaporizer may be from 1 mm, 2 mm, 3 mm, 4 mm, 5 mm, 6 mm, 7 mm, 8 mm, 9 mm or 10 mm. The width may generally be smaller than the length of the aerosol generating component.

Where the aerosol generating component is formed from an electrically resistive material, electrical current is permitted to flow through the aerosol generating component so as to generate heat (so called Joule heating). In this regard, the electrical resistance of the aerosol generating component can be selected appropriately. For example, the aerosol generating component may have an electrical resistance of 2 ohms or less, such as 1.8 ohms or less, such as 1.7 ohms or less, such as 1.6 ohms or less, such as 1.5 ohms or less, such as 1.4 ohms or less, such as 1.3 ohms or less, such as 1.2 ohms or less, such as 1.1 ohms or less, such as 1.0 ohm or less, such as 0.9 ohms or less, such as 0.8 ohms or less, such as 0.7 ohms or less, such as 0.6 ohms or less, such as 0.5 ohms or less. The parameters of the aerosol generating component, such as material, thickness, width, length, porosity etc. can be selected so as to provide the desired resistance. In this regard, a relatively lower resistance will facilitate higher power draw from the power source, which can be advantageous in producing a high rate of aerosolization. On the other hand, the resistance should not be so low so as to prejudice the integrity of the aerosol generator. For example, the resistance may not be lower than 0.5 ohms.

Planar aerosol generating components, such as heating elements, suitable for use in systems, devices and articles disclosed herein may be formed by stamping or cutting (such as laser cutting) the required shape from a larger sheet of porous material. This may include stamping out, cutting away or otherwise removing material to create openings in the aerosol generating component. These openings can influence both the ability for air to pass through the aerosol generating component and the propensity for electrical current to flow in certain areas.

Figure 2:
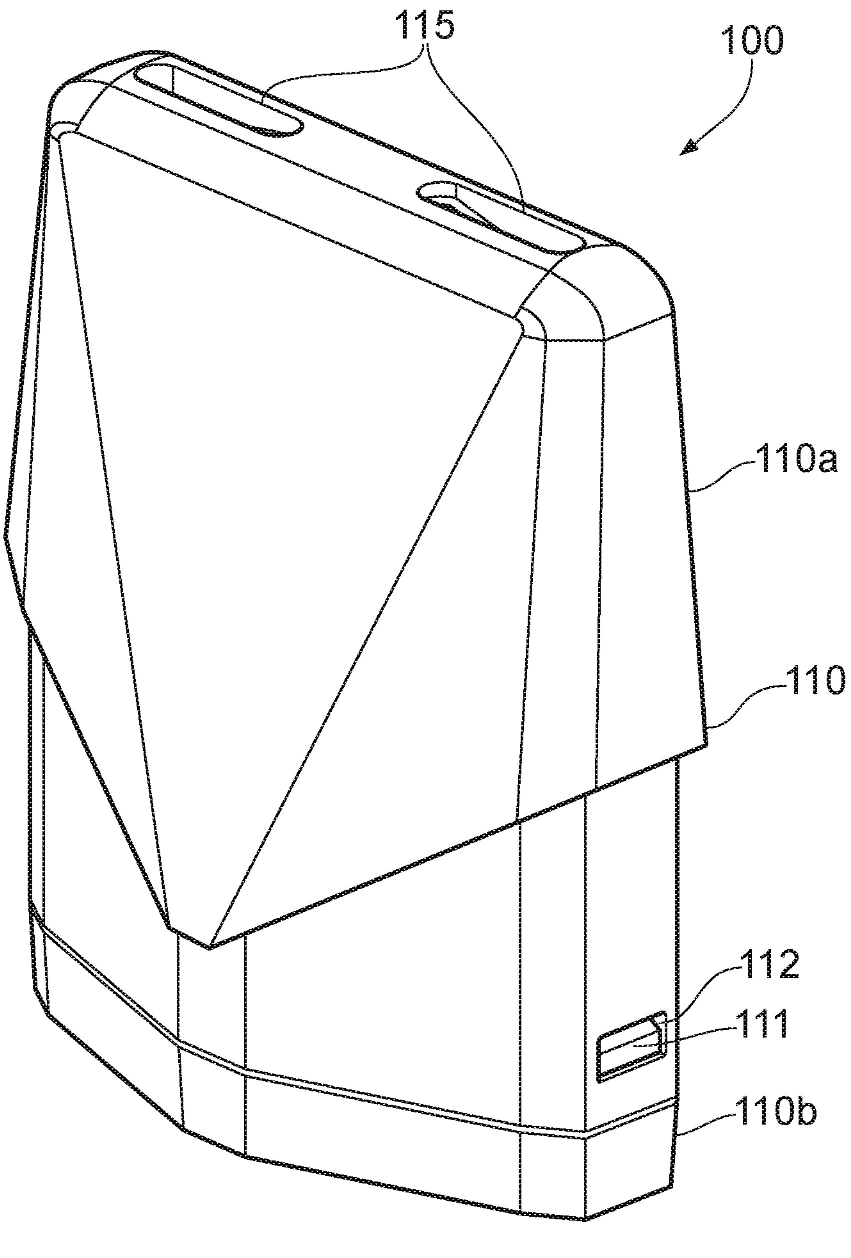
FIG. 2 is a diagram of an article for an aerosol provision device according to the present disclosure.

FIG. 2 shows an exemplary article 100 according to the present disclosure. Article 100 contains an outer housing 110 which in this example is formed by the coming together of first and second outer housing component 110*a* and 110*b*. The specific external appearance of the outer housing 110 is not limiting, although in the illustration of FIG. 2 the outer housing 110 has a multi-faceted surface. The outer housing 110 contains at least one outlet 115. As show in the example of FIG. 2, there may be two outlets. Said outlet 115 is for conveying aerosol generated within the article 100 to the mouth of the user. Thus, in the example shown in FIG. 2, outer housing 110 also forms the mouthpiece of the article.

First outer housing component 110*a* mates with second outer housing component 110*b* so as to form outer housing 110. In the example shown in FIG. 2, the components fit together via a snap fit arrangement. In particular, resilient tabs 111 on outer housing component 110*b* (only one side of which is visible in FIG. 2), snap into corresponding receiving apertures 112 on outer housing 110*a*. It will be appreciated that the precise location of the tabs and apertures are not limited, and indeed the tabs may be formed on outer housing component 110*a* and apertures on outer housing component 110*b*.

Figure 3:
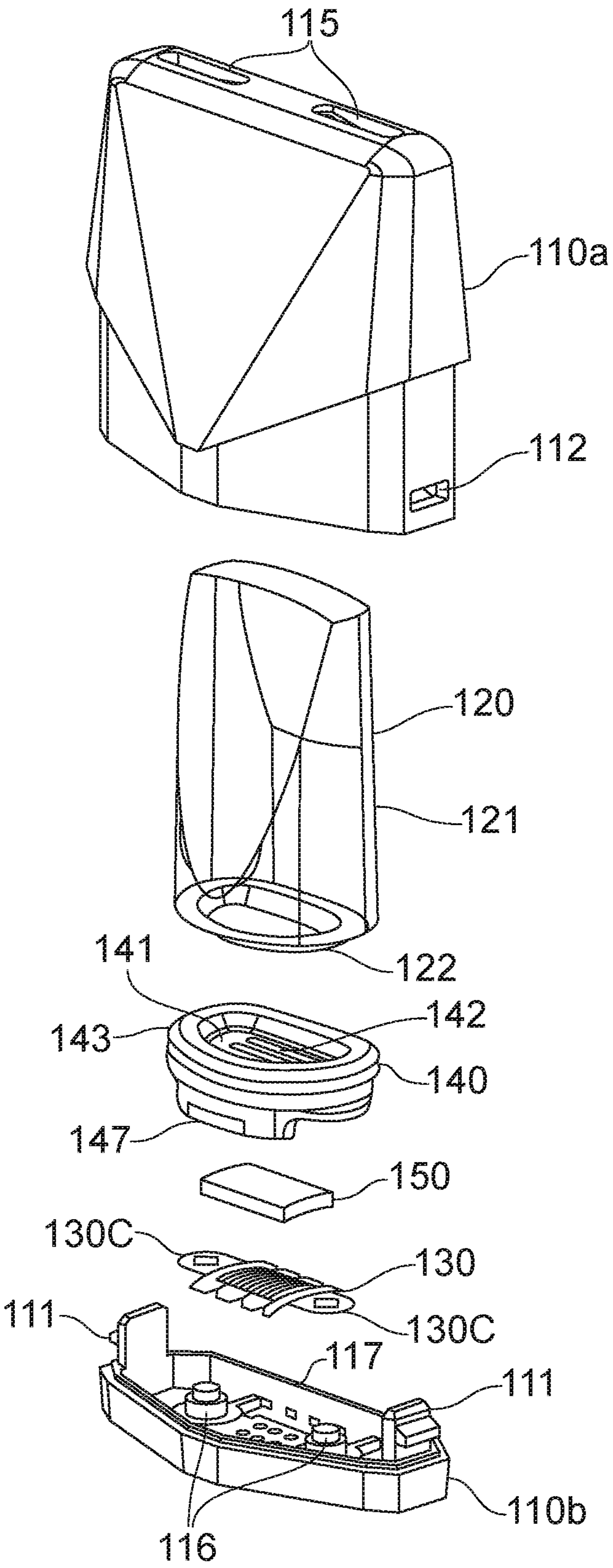
FIG. 3 is an exploded diagram of the article of FIG. 2.
Figure 6A:
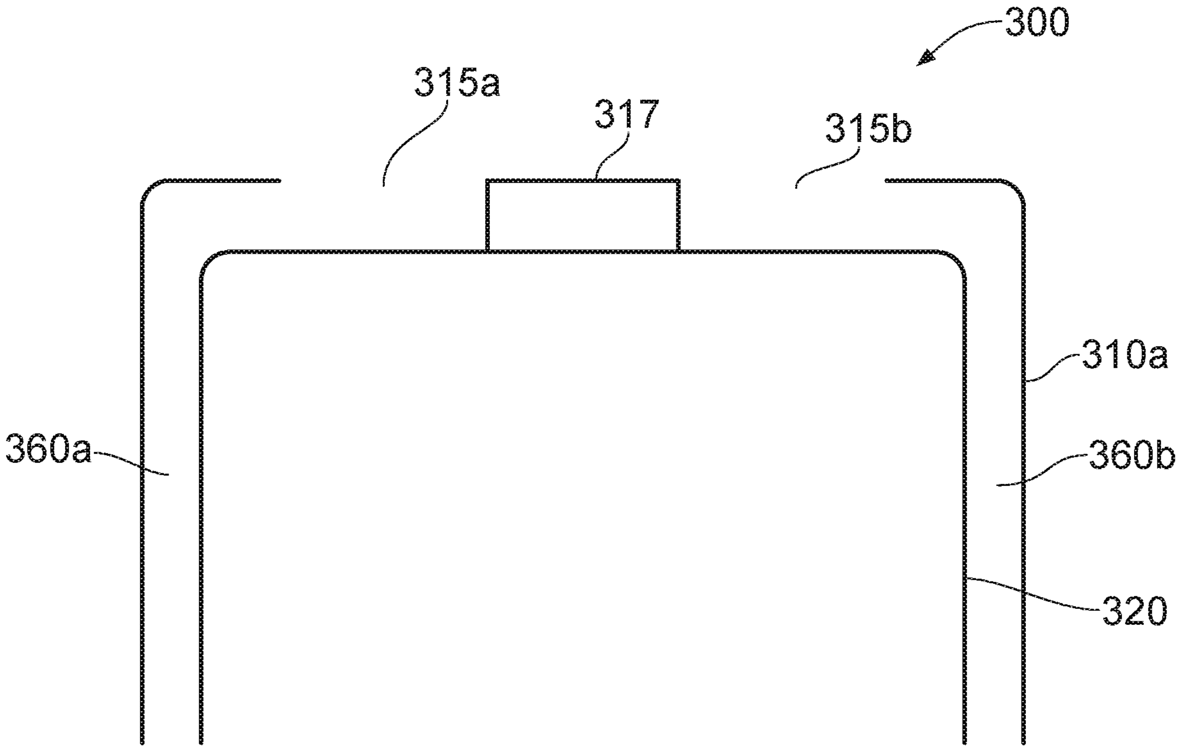
FIG. 6*a* is a cross-sectional view through a mouth-end part of an article for an aerosol provision device according to the present disclosure.

FIG. 3 shows an exploded diagram of the exemplary article 100 from FIG. 2. In particular, outer housing component 110*a* is shown separated from outer housing component 110*b* to reveal inner housing component 120, aerosol generating component 130 (which in this example is an electrically resistive metallic heater), flow regulator 140 and pad 150. Inner housing component 120 is configured so as to define a storage area 121 for aerosolizable material (not shown). Inner housing component 120 is sleeved at least partially inside outer housing component 110*a*. It is possible for inner housing component 120 to be connected to outer housing component 110*a* (for example they may be attached together or part of the same molding as is shown in FIG. 6*c*). Inner housing component 120 has an open end 122 which mates with flow regulator 140. Together, open 122 and flow regulator 140 define a path for aerosolizable material to flow from storage area 121 to pad 150. An optional mouthpiece (not shown) may be sleeved over the outside of the outer housing component 110*a* (or the outer housing can form the mouthpiece).

Flow regulator 140 contains a recess 141 into which open end 122 of the inner housing component 120 can be received. Recess 141 may contain one or more openings 142 which allow for the flow of aerosolizable material through the flow regulator. In the example of FIG. 3 the openings are slot shaped, but it will be appreciated that one or more of the openings may take a different cross section, such as circular, oval, or polygonal. Moreover, the cross sectional area of the one or more openings may vary through the length of the flow regulator. Thus, the one or more openings may have a larger cross sectional area at a location which is towards the liquid storage area compared to the cross sectional area at a location towards the pad 150. Flow regulator 140 also contains an annular seal 143 around its perimeter which serves to inhibit egress of aerosolizable material from the boundary between inner housing component 120 and flow regulator 140. Flow regulator 140 also contains a surface against which the aerosol generating component may be biased, and thus in some instances acts as a heater support.

Pad 150 may be formed of a capillary material which is suited to holding aerosolizable material. In particular, as aerosolizable material flows through flow regulator 140, pad 150 becomes saturated with aerosolizable material. However, due to the capillary nature of pad 150 leakage of aerosolizable material from pad 150 is inhibited. Aerosol generating component 130 is located in proximity to pad 150 such that when aerosol generating component 130 is energized (resistively heated in this case), aerosolizable material present in pad 150 is vaporized. As explained above, it is envisaged that pad 150 and aerosol generating component 130 may be combined as a single component.

Aerosol generating component 130 is arranged towards outer housing component 110*b*. Electrical pins 116 on outer housing component 110*b* contact aerosol generating component 130 at tabs 131 so as to allow for electrical current to flow through aerosol generating component 130 during actuation of the system. Outer housing component 110*b* contains at least one air inlet 117 which allows for air ingress into the article 100. During use, air enters article 100 via the at least one air inlet 117 whereby it mixes with vapor produced from aerosol generating component 130. The resulting aerosol is then directed to the one or more air outlets 115 via at least one channel 160 (not shown) which extends between outer housing component 110*a* and inner housing component 120. For example, in the embodiment of FIG. 2 there are two channels (not shown) which extend longitudinally along the length of the article 100 and cooperate with air outlets 115 so as to create a flow path through the article.

According to one aspect, the outer housing and inner housing may contain respective stabilizing surface features which interact with one another. These surface features allow for the production of housing walls which are relatively thin and yet are sufficiently resilient such that the channels for aerosol passage mentioned above do not collapse. For example, there is disclosed an article for use as part of a non-combustible aerosol provision system, the article comprising an outer housing enclosing at least a portion of an inner housing such that an airflow channel is present between the outer and inner housing, wherein one of the outer housing and the inner housing contains a surface feature configured to mate with a corresponding surface feature of the other of the outer housing and the inner housing.

Figure 4A:
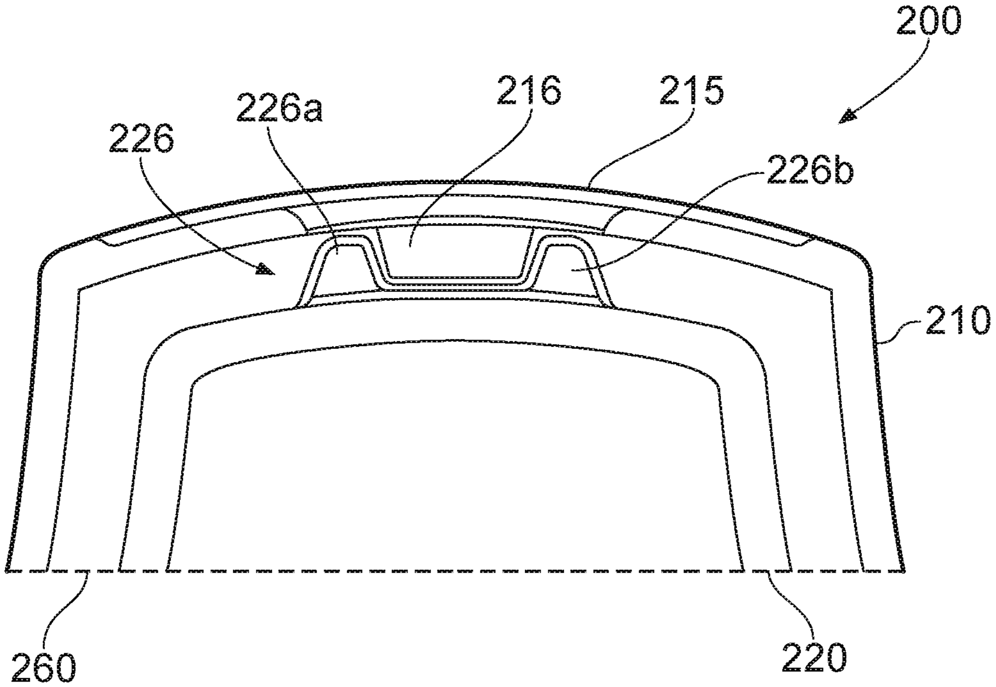
FIG. 4*a* is a cross-sectional view through a mouth-end part of an article for an aerosol provision device according to the present disclosure.
Figure 4B:
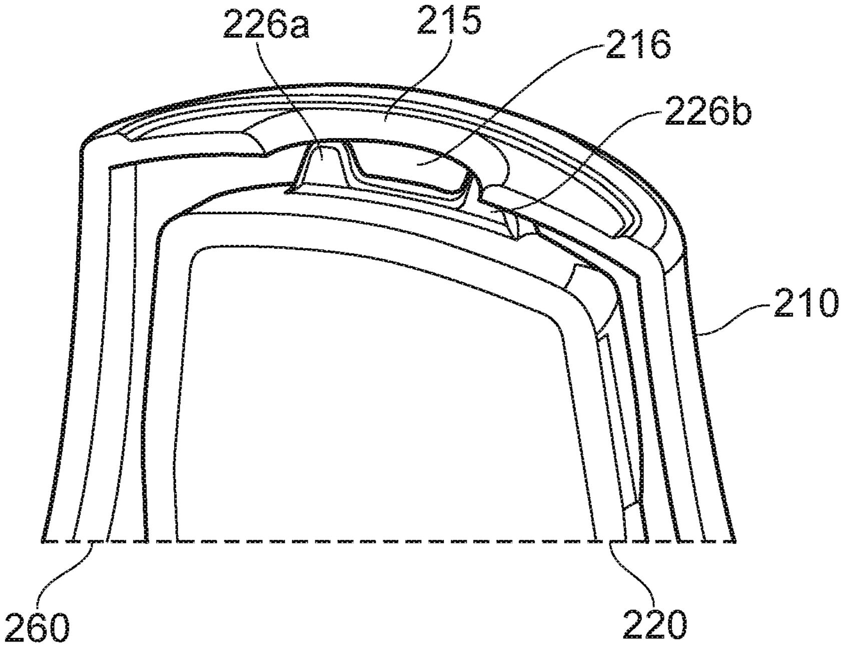
FIG. 4*b* is a perspective view of the article of FIG. 4*a*.

FIG. 4*a* provides a cross-sectional view through the mouth-end part of an article 200 according to the present disclosure. FIG. 4*b* shows a perspective view of the cross-section of FIG. 4*a*. Article 200 contains an outer housing component 210 and an inner housing component 220. As with the example of FIG. 2, inner housing component 220 is configured to define a storage area for aerosolizable material. Inner housing component 220 is sleeved within outer housing component 220 such that an airflow channel 260 is formed between the opposing walls of the outer and inner housings. Channel 260 extends from an air inlet (not shown) into the article 200 though to an air outlet 215. According to the example of FIG. 4*a*, inner housing component 220 comprises a surface feature 226 which is configured to mate with a corresponding surface feature 216 of the outer housing component 210. According to the example of FIG. 4*a*, surface feature 226 is formed of two projections 226*a* and 226*b*. These projections are spaced apart so as to provide a receiving gap for surface feature 216 of the outer housing component 210. In some examples, each surface feature has a height which is substantially equivalent to the distance between the opposing walls of the inner and outer housings which form the channel 260. As a result, the surface features serve to provide support for each of the respective housings. For example, the surface features can prevent or reduce compression of the wall of the outer housing component 210 into the channel 260. This ensures that the channel dimensions are more stable during use. Moreover, due to the cooperating nature of the respective surface features, lateral movement of the housings with respect to one another can be reduced. Accordingly, the surface features can provide for a more robust article, can also facilitate the use of less material to form the housings (since the walls may be thinner), and can provide for more consistent airflow through the device.

It will be appreciated that the precise configuration of the surface features may vary so depending upon the overall shape of the article. For example, each surface feature may contain at least one projection. Each surface feature may contain more than one protection. The surface feature of one of the outer housing or the inner housing may contain more projections than the surface feature of the other of the outer housing and the inner housing. The surface feature of the outer housing may be located in proximity to at least one outlet of the outer hosing. The projections of the surfaces feature may extend substantially along the longitudinal axis of the article. Each surface feature may be formed from one, two, three, four or more projections. Where a housing contains a surface feature with more than one projection, such projections may be arranged in-line, or they may be off-set, relative to a longitudinal cross-section, i.e. at least one projection is the other side of the cross-section. The surface features are generally formed at the time of molding the housings and as such are formed from the same material as the housing. Suitable materials in this regard are plastics, such as polypropylene or polycarbonate. Alternatively, the surface features could be formed following a two-shot process and be formed from different materials relative to the housing. Due to the use of the surface features, the thickness of the housing walls can be reduced and this can allow for cost savings. It may also be advantageous if the plastic is transparent, as the user is then provided with a clearer indication of the amount of aerosolizable material in the storage area.

According to one aspect, multiple airflow channels feed dedicated air outlets in the article. For example, there is disclosed an article for use as part of a non-combustible aerosol provision system, the article comprising an outer housing enclosing at least a portion of an inner housing such that a plurality of discrete airflow channels are provided between the inner and outer housings, each airflow channel extending to a corresponding air outlet in the outer housing. This can be advantageous as a reduced aerosol density along each channel can be maintained right up to the outlet of the article. This can help avoid aerosol condensing within the channel and/or at the outlet and thus reduce the potential for leakage of condensed aerosol which can be unpleasant for the user as it may leak from the article.

Figure 5:
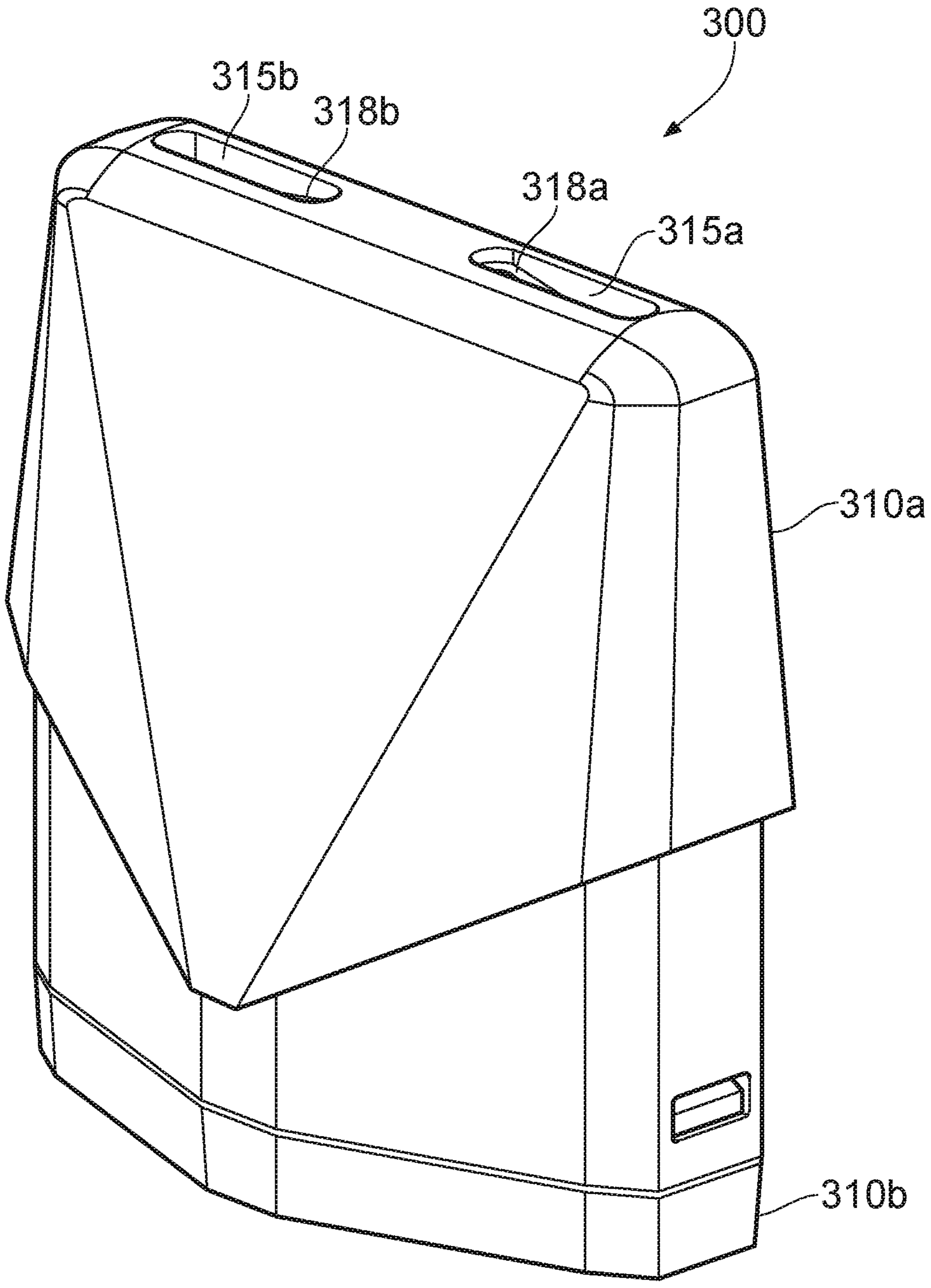
FIG. 5 is an illustration of an article for an aerosol provision device according to the present disclosure.

FIG. 5 provides an illustration of a further exemplary embodiment of the present disclosure. In particular, FIG. 5 shows an article 300 comprising an outer housing component 310*a* and outer housing component 310*b*. As described with respect to article 100, article 300 also contains an inner housing component 320 (not visible in FIG. 5), which is at least partially sleeved within outer housing component 310*a*. Outlets 315*a* and 315*b* are present in outer housing component 310*a*. Each outlet is in fluid communication with a dedicated airflow channel 360*a* and 360*b* respectively (not visible in FIG. 5). In a similar manner to as described with article 200, airflow channels 360*a* and 360*b* extend longitudinally along the article between the outer housing component 310*a* and inner housing component 320. However, whereas in the article 200 the respective channels meet at a single location (the outlet 215), in the example of FIG. 5, the airflow channels 360*a* and 360*b* do not meet and instead exclusively feed outlets 315*a* and 315*b* respectively. This can be more easily seen in the schematic illustrations of FIGS. 6*a* and 6*b*, which correspond to cross-sections through article 300. As can be seen in FIG. 6*a*, the airflow channels 360*a* and 360*b* do not meet and instead exclusively feed outlets 315*a* and 315*b* respectively. This exclusivity arises due to the presence of dividing wall 317 which separates the respective flow channels. As illustrated, the outlets of this example may take the form of slots. As the airflow channels 360*a* and 360*b* approach the slotted outlets 315*a* and 315*b*, the channel height may get progressively smaller. In other words, the slotted outlets may be fed via a sloped surface 318*a*/318*b* respectively. This sloped surface has the advantage of being able to direct any aerosol condensate that has formed at or near the outlet into the respective feeding channel 360*a*/360*b*. Additionally, the sloped surface can provide for a smoother flow path out of the outlet compared to the more turbulent scenario that would exist if two opposing channels were to meet, or if the channels 360*a*/360*b* ended more abruptly (as in FIG. 6*a*). The gradient of the slope can generally be defined with respect to the plane of the outlet (which is shown in dotted line in FIG. 6*b*). In some examples, the slope is between 10° and 45°.

Where the outlets are configured as slots, they may have a length of at least 1 mm, at least 2 mm, at least 3 mm, at least 4 mm, at least 5 mm, at least 6 mm, at least 7 mm, at last 8 mm, at least 9 mm or at least 10 mm.

Figure 6B:
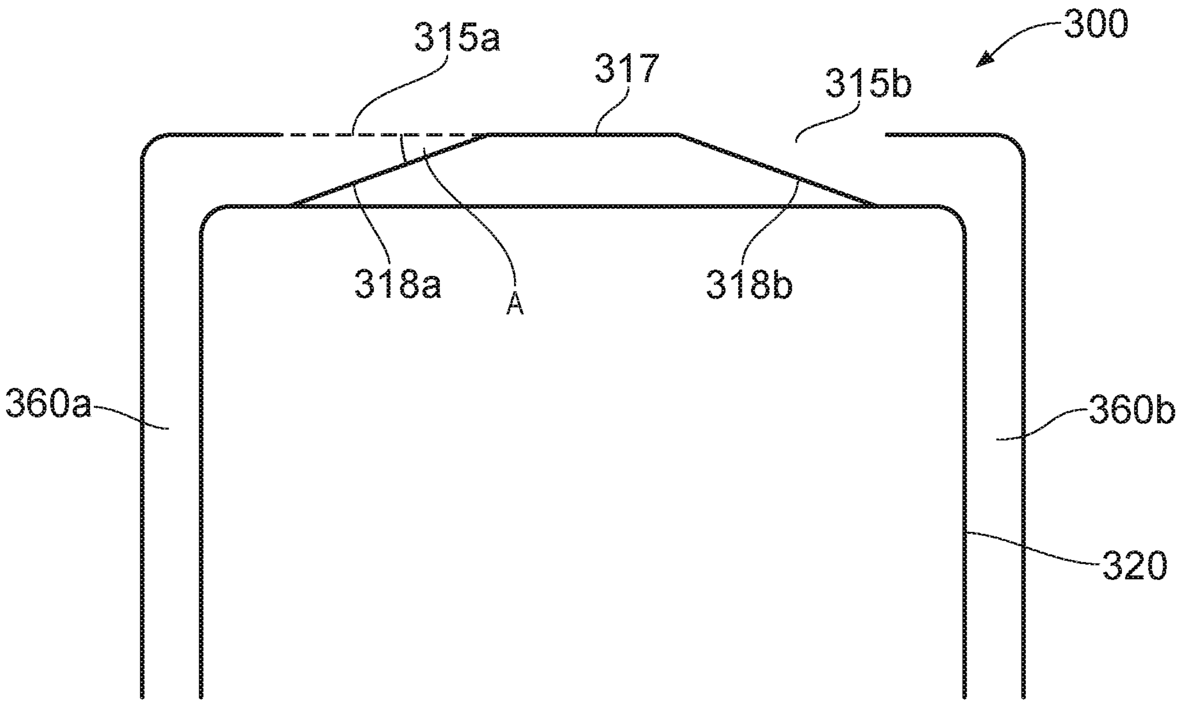
FIG. 6*b* is a cross-sectional view through a mouth-end part of an article for an aerosol provision device according to the present disclosure.
Figure 6C:
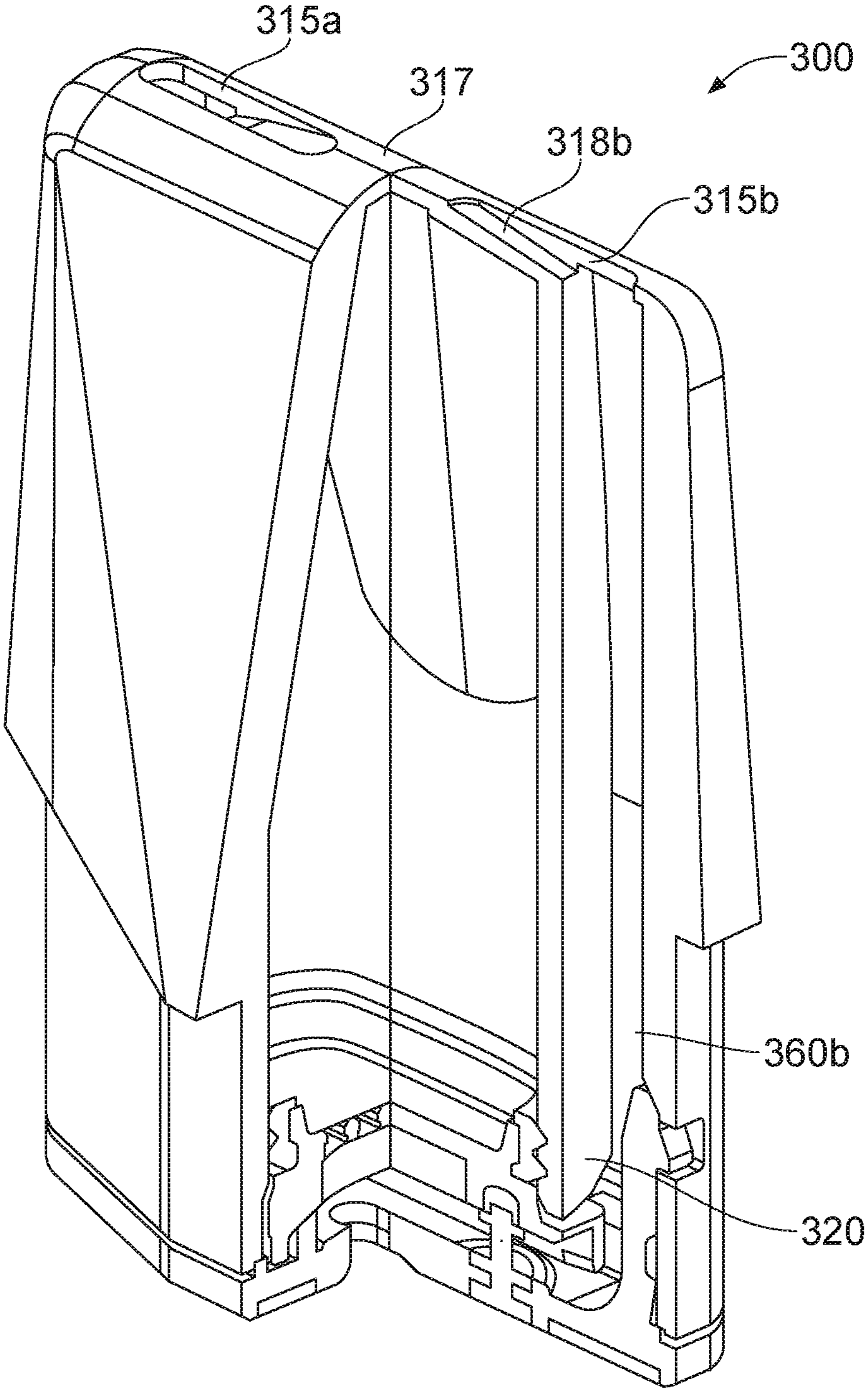
FIG. 6*c* is a cut-away perspective view of the article of FIG. 6*b*.

FIG. 6*c* shows a cut-away view of an article 300 as depicted in FIG. 6*b* (parts of the article not mentioned in the context of FIG. 6*b* are not labelled in respect of FIG. 6*c*). As can be seen from FIG. 6*c*, the outlets of this example may take the form of slots. As the airflow channel 360*b* (outlet 360*a* is not visible in FIG. 6*c*) approaches the slotted outlet 315*b*, the slotted outlet is fed via a sloped surface 318*b*. This sloped surface has the advantage of being able to direct any aerosol condensate that has formed at or near the outlet into the respective feeding channel 360*b*. Additionally, the sloped surface can provide for a smoother flow path out of the outlet compared to the more turbulent scenario that would exist if two opposing channels were to meet, or if the channels 360*a*/360*b* ended more abruptly (as in FIG. 6*a*). As mentioned above, the gradient of the slope can generally be defined with respect to the plane of the outlet (which is shown in dotted line in FIG. 6*b*). In some examples, the slope is between 10° and 75°. In some examples, the slope is between 10° and 65°. In some examples, the slope is between 10° and 55°. In some examples, the slope is between 10° and 45°. In some examples, the slope is between 15° and 75°. In some examples, the slope is between 25° and 75°. In some examples, the slope is between 35° and 75°. It may also be possible for the sloped surface to take on a curved profile, e.g. it may have a convex or concave profile.

In some examples, the dimensions of the airflow channel present between the outer and inner housing are carefully controlled so as to promote laminar airflow along the channel. In particular, the distance (d1) between the opposing walls of the outer housing component and the inner housing component at one section along the airflow channel and the distance (d2) between the opposing walls of the outer housing component and the inner housing component at any other section along the airflow channel may vary such that $(d2-d1)/d1\times100<10\%$. This helps ensure that the airflow is not subjected to increased turbulence when flowing through the channel.

Figure 7A:
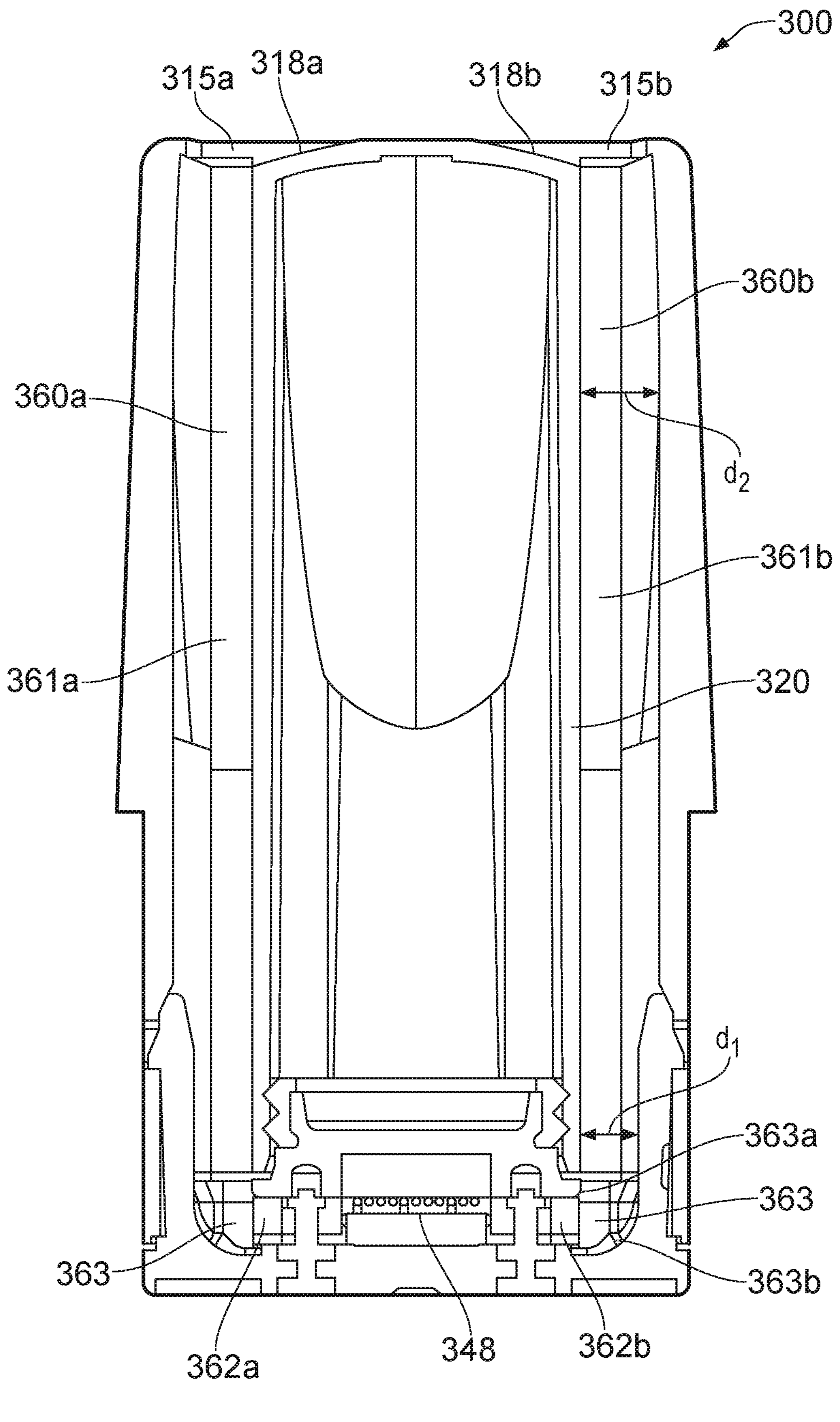
FIG. 7*a* is an illustration of an article for an aerosol provision device according to the present disclosure.

FIG. 7*a* provides an illustration of a further exemplary embodiment of the present disclosure. In particular, FIG. 7*a* shows an article 300 comprising an outer housing component 310 and an inner housing component 320. Airflow channels 360*a* and 360*b* extended longitudinally between the walls of outer housing component 310 and inner housing component 320. In particular, airflow channels 360*a* and 360*b* extend between their respective outlets 315*a* and 315*b* and aerosol generation chamber 348. Thus, each airflow channel 360*a*,360*b* forms a pathway for aerosol to be conveyed from the aerosol generating chamber to the respective outlet. Each airflow channel may contain a longitudinal section 361*a*, 361*b* and a lateral section 362*a*, 362*b*. The longitudinal section is generally parallel with the longitudinal axis of the article, whilst the lateral section is generally perpendicular to the longitudinal axis of the article. The longitudinal section and lateral section of each channel may meet at a joint section 363. The longitudinal section is generally greater in length than the lateral section. For example, the longitudinal section may make up greater than 50%, greater than 60%, greater than 70%, greater than 80%, or greater than 90% of the total length of the airflow channel (with the length contributed by the joint section being discounted for the purposes of determining the relative proportion of contribution). The joint section may have a degree of bend of from 80° to 100°, such as about 90°.

In one embodiment, the variation between the deepest and shallowest sections along opposing walls of the outer and inner housing components that define the longitudinal sections 361*a* and 361*b* of the airflow channel is not more than 10% at any point along the longitudinal section of the airflow channel. For example, where d1 is a distance between opposing walls of the outer and inner housing components at a first section along the airflow channel, and d2 is a distance between opposing walls of the outer and inner housing components at a second section along the airflow channel, $(d2-d1)/d1\times100<10\%$. In some embodiments, $(d2-d1)/d1\times100<9\%$. In some embodiments, $(d2-d1)/d1\times100<8\%$. In some embodiments, $(d2-d1)/d1\times100<7\%$. In some embodiments, $(d2-d1)/d1\times100<6\%$. In some embodiments, $(d2-d1)/d1\times100<5\%$.

By controlling the depth of the longitudinal section of the airflow channel to be very consistent it is possible to reduce the propensity for condensation to be generated within the longitudinal section.

In one embodiment, the outer profile of the article (which may be formed by the outer housing component or a mouthpiece sleeved over the outer housing component) tapers towards the proximal end of the article (the proximal end being the end where the aerosol outlets are located). This tapering is advantageous in order to promote a more ergonomically designed mouthpiece. However, where there are multiple airflow channels which are disposed either side of the inner housing component, such tapering might have led to a corresponding tapering of the airflow channels. In the present embodiment significant tapering of the airflow channels is avoided.

In some examples, the profile of the one or more airflow paths from the aerosol generating chamber to the outlet should be configured so as to reduce the formation of condensation. Accordingly, in one aspect there is provided an article for use as part of a non-combustible aerosol provision system, wherein the article comprises at least one aerosol outlet and at least one airflow channel, wherein the at least one aerosol outlet is arranged in fluid communication with the at least one airflow channel, wherein the at least one airflow channel has a longitudinal section and a lateral section connected together via a joint section, wherein the joint section has a curved outer wall. Without being bound by theory, the curved outer wall is understood to reduce turbulent airflow and increase laminar airflow as the airflow (and thus aerosol during use) travels around the joint section. This in turn leads to reduced condensation being formed within the article.

Referring again to FIG. 7*a*, there is shown an article 300 comprising an outer housing component 310 and an inner housing component 320. Airflow channels 360*a* and 360*b* extended longitudinally between the walls of outer housing component 310 and inner housing component 320. In particular, airflow channels 360*a* and 360*b* extend between their respective outlets 315*a* and 315*b* and aerosol generation chamber 348. Thus, each airflow channel 360*a*,360*b* forms a pathway for aerosol to be conveyed from the aerosol generating chamber to the respective outlet. Each airflow channel may contain a longitudinal section 361*a*, 361*b* and a lateral section 362*a*, 362*b*. The longitudinal section is generally parallel with the longitudinal axis of the article, whilst the lateral section is generally perpendicular to the longitudinal axis of the article. The longitudinal section and lateral section of each channel may meet at a joint section 363. The longitudinal section and lateral section is generally greater in length than the lateral section. For example, the longitudinal section may make up greater than 50%, greater than 60%, greater than 70%, greater than 80%, or greater than 90% of the total length of the airflow channel (with the length contributed by the joint section being discounted for the purposes of determining the relative proportion of contribution).

Joint section 363 will now be further described. Joint section 363 contains an inner wall section 363*a* (at the apex of the joint) and an outer wall section 363*b*. The outer wall section 363 is formed as a curved outer wall. This is contrast to the outer wall configuration of the joint section shown in FIG. 3, where the outer all of the joint section is formed by intersecting linear walls, not a curved outer wall. Reference to an outer wall of the joint section refers to a section of the airflow channel as opposed to the outer surface of the outer housing.

Figure 7B:
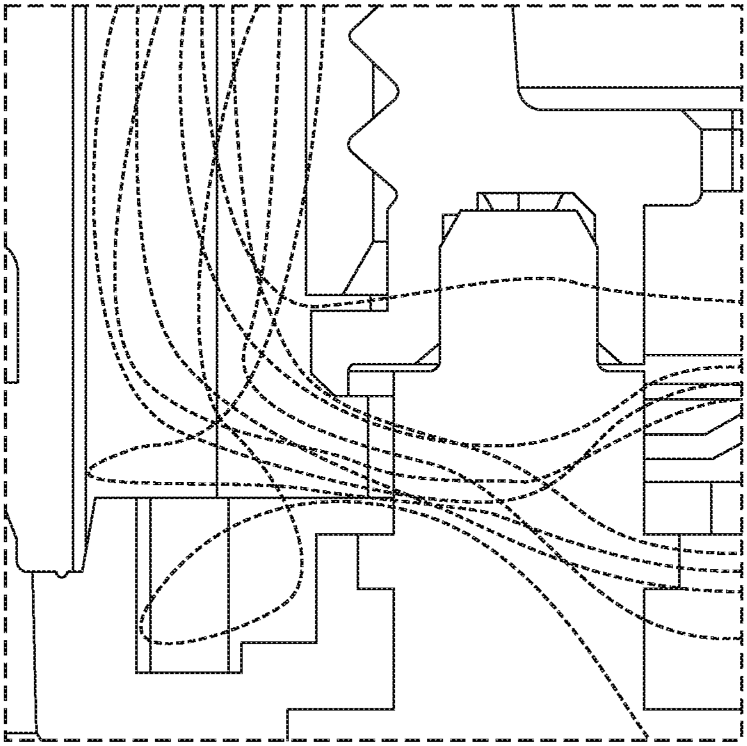
FIG. 7*b* is an illustration showing turbulence in an airflow in a portion of an article in accordance with the article of FIG. 3.
Figure 7C:
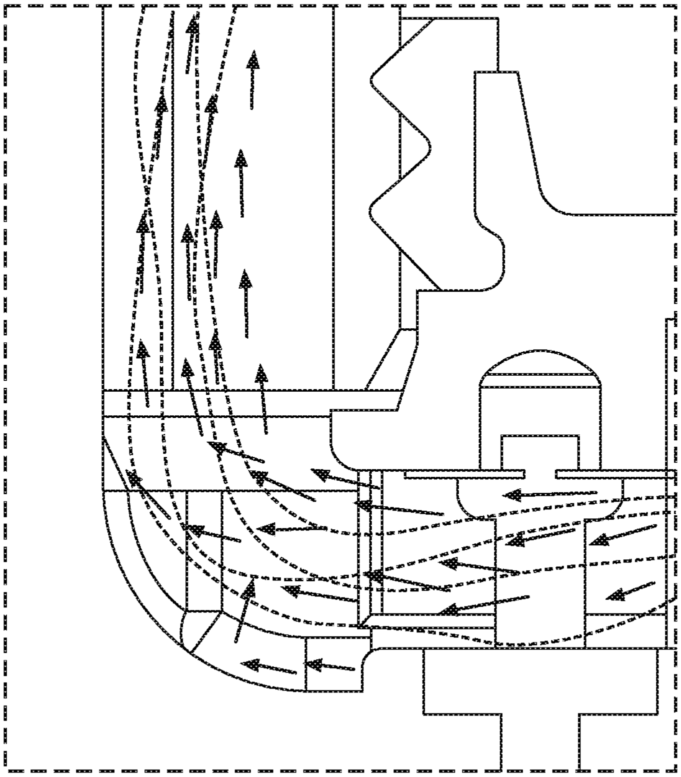
FIG. 7*c* is an illustration showing turbulence in an airflow in a portion of an article in accordance with the article of FIG. 7*a*.

The impact of configuring the joint section to have a curved outer wall can be seen by comparing the images of FIGS. 7*b* and 7*c*. In FIG. 7*b*, where the joint section is formed as shown in the embodiment of FIG. 3, there is increased turbulence as the airflow and aerosol transitions through the joint section. In contrast, where the joint section has a curved outer wall as shown in FIG. 7*c* the turbulent airflow is reduced.

In some examples, and as explained above, there are at least two airflow channels, each containing at least one joint section having a curved outer wall.

In some examples, there is a further joint section connecting the longitudinal section of the airflow channel with the at least one aerosol outlet of the article. This further joint section may also have a curved outer wall.

In some examples, the location of the air inlets into the article should be controlled in order to ensure alignment with the aerosol generating component. In one aspect, an article is provided for use as part of a non-combustible aerosol provision system, the article comprising a housing and a substantially planar aerosol generating component, wherein the housing comprises a plurality of air inlets disposed within a first plane at a first end, wherein the aerosol generating component forms a second plane, wherein the plurality of inlets are entirely within the perimeter defined by the aerosol generating component when viewed along the an axis perpendicular to the first plane. In some embodiments, the second plane is slightly angled relative to the first plane. For example, the second plane may be angled relative to the first plane by up to 15 degrees, up to 10 degrees, up to 8 degrees, up to 5 degrees, or up to 2 degrees. In some embodiments, the second plane is substantially parallel to the first plane.

The plurality of inlets may be entirely within the perimeter defined by the aerosol generating component when viewed along an axis perpendicular to the first plane and the second plane.

As explained above, with respect to FIG. 3, aerosol generating component 130 is arranged towards outer housing component 110*b*. Electrical pins 116 on outer housing component 110*b* contact aerosol generating component 130 at tabs 131 so as to allow for electrical current to flow through aerosol generating component 130 during actuation of the system. Outer housing component 110*b* contains at least one air inlet 117 which allows for air ingress into the article 100. During use, air enters article 100 via the at least one air inlet 117 whereby it mixes with vapor produced from aerosol generating component 130. The resulting aerosol is then directed to the one or more air outlets 115 via at least one channel 160 (not shown) which extends between outer housing component 110*a* and inner housing component 120.

As shown in FIG. 3, there are multiple air inlets 117. In the example of FIG. 3, there are six air inlets, however it is envisaged that there may be two, three, four, five, six, seven or eight air inlets. Each air inlet extends from the outside of the article 100 directly into an aerosol generating chamber 148. Each air inlet 117 may extend through the second outer housing component 110*b*. The aerosol generating chamber 148 may be formed by an inwardly facing surface of the second outer housing component 110*b* and flow component 140. Aerosol generating component 130 is located within the chamber 148 formed by the coming together of second outer housing component 110*b* and flow component 140.

Figure 8A:
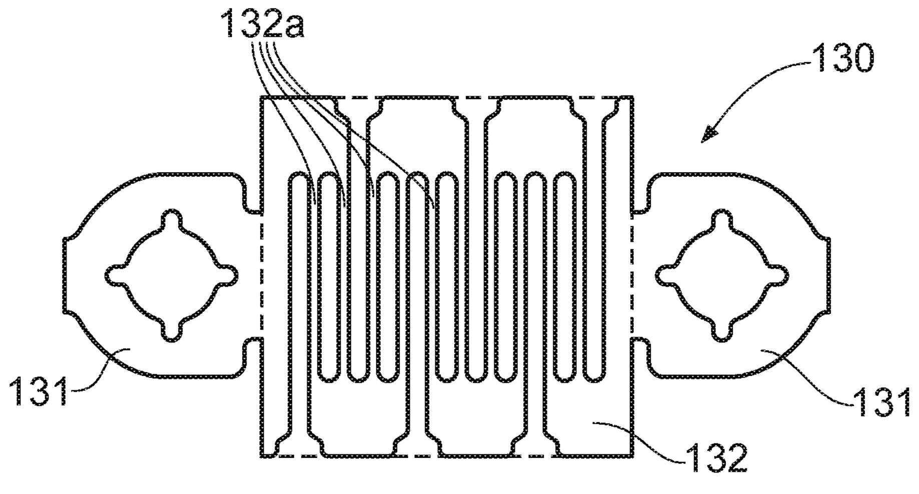
FIGS. 8*a* and 8*b* are plan views along the longitudinal axis of an article for an aerosol provision device according to the present disclosure, the plan views depicting an arrangement whereby a housing of the article comprises a plurality of air inlets being entirely within a perimeter defined by a heater.
Figure 8B:
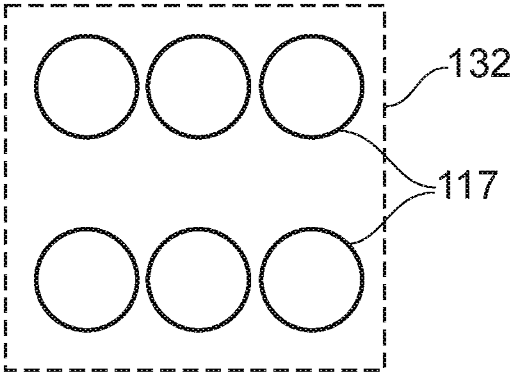

FIGS. 8*a* and 8*b* show the arrangement whereby the housing of the article comprises a plurality of air inlets being entirely within the perimeter defined by the heater when viewed along the longitudinal axis. In particular, FIG. 8*a* shows a plan view of the aerosol generating component 130 of FIG. 1. As described above, the aerosol generating component 130 comprises tab sections 131 which serve to contact the electrical pins 116 of the article so as to allow for current to flow through the aerosol generating component 130. Aerosol generating component 130 comprises a heated section 132. The heated section is generally defined by a temperature perimeter which is within 10% of the part of the heater with the highest temperature during normal use. In other words, those areas where the temperature of the heater drops below 10% of the highest temperature experienced by the heater during normal use are outside of the perimeter of the heated section.

The heated section 132, in the example of FIGS. 3 and 8*a*, comprises multiple parallel filament sections 132*a* which are separated by corresponding parallel spaces. Owing to their reduced width, sections 132*a* have a relatively higher resistance and thus experience greater heating when current flows through them. As a result, the heater generally is heated to a higher temperature within the heated section 132 which contains said filaments. It is advantageous that the openings of the airflow inlets 117 that lead into the aerosol generating chamber are concentrated within the perimeter of the heater, in particular within the perimeter of heated section 132. An example of this can be seen in FIG. 8*a*, which is a schematic plan view of the outline of heated section 132 overlayed on a plan view of the airflow inlets 117. As can be seen, airflow inlets 117 are within the perimeter of the heated sections. The airflow inlets 117 can be distributed in various ways within the perimeter of the heater. For example, where there are between two and six air inlets, they may be configured as would be found on a dice.

Figure 8C:
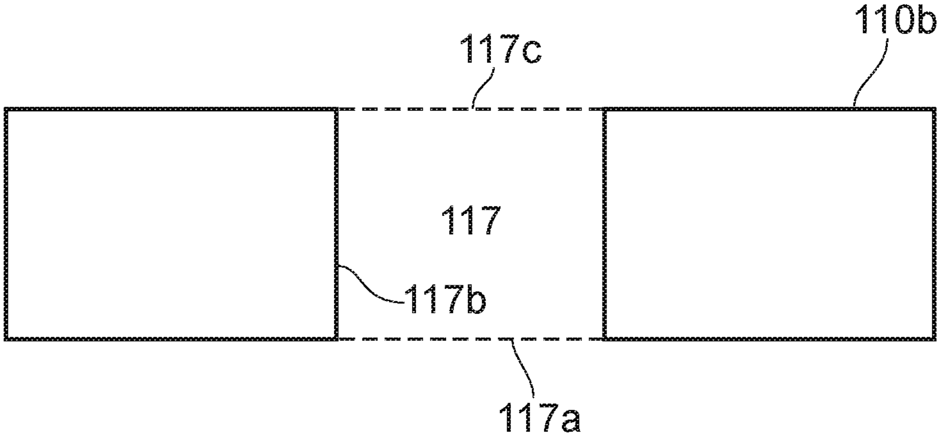
FIG. 8*c* is a cross sectional view through an air inlet of the air inlets of FIG. 8B.

FIG. 8*c* shows a cross section through an air inlet 117 extending through the second outer housing component 110*b*. As illustrated in FIG. 8*c*, each air inlet 117 has an opening 117*a*, a neck section 117*b* and an outlet 117*c*. The opening and outlet section of each air inlet may be the same shape and/or dimension, or they may be of a different shape and/or dimension. The neck portion 117*b* extends between the opening and outlet section of each air inlet. Different sized and shaped opening and outlets will lead to differently shaped neck portions. For example, by changing the shape of the opening and outlet sections, it is possible to vary the flow through the neck portion of the air inlet. In one embodiment, both the opening and outlet sections of at least one air inlet are the same. In one embodiment, both the opening and outlet sections of at least one air inlet are different. In one embodiment, both the opening and outlet sections of at least one air inlet have a circular shape. In one embodiment, both the opening and outlet sections of at least one air inlet have an oval shape. In one embodiment, both the opening and outlet sections of at least one air inlet have a slot shape. In one embodiment, both the opening and outlet sections of at least one air inlet have a polygonal shape.

Likewise, by changing the dimension of the opening and outlet sections, it is possible to vary the flow through the air inlet. In one embodiment, the opening and outlet sections of at least one air inlet have the same cross-sectional area. In one embodiment, the opening and outlet sections of at least one air inlet have a different cross-sectional area. In one embodiment, the opening has a smaller cross-sectional area than the outlet section. In one embodiment, the opening has a larger cross-sectional area than the outlet section.

In one embodiment, at least two of the plurality of air inlets share the same size and shape neck portion. In one embodiment, at least three of the plurality of air inlets share the same size and shape neck portion. In one embodiment, at least four of the plurality of air inlets share the same size and shape neck portion. In one embodiment, at least five of the plurality of air inlets share the same size and shape neck portion. In one embodiment, at least six of the plurality of air inlets share the same size and shape neck portion. In one embodiment, all of the plurality of air inlets share the same size and shape neck portion.

In some examples, it is advantageous if the aerosol generating component can be held in place in a simple and convenient manner. In particular, in some embodiments there is provided an article for use as part of a non-combustible aerosol provision system, the article comprising an outer housing component coupled to a heater support, wherein the outer housing component has at least one projection comprising a surface shaped so as to bias to a substantially planar aerosol generating component against a corresponding surface on the heater support when the outer housing component is coupled to the heater support.

Figure 9:
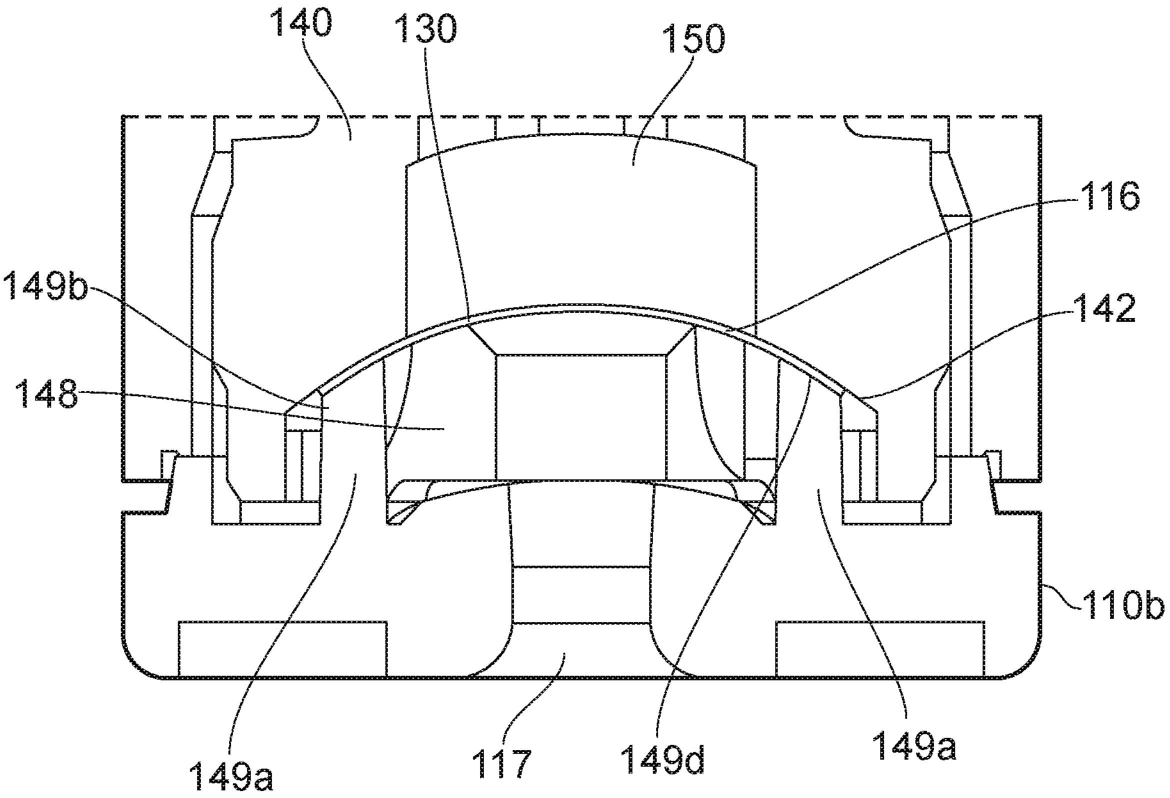
FIG. 9 is a cross-sectional view of an aerosol generating chamber of an article for an aerosol provision device according to the present disclosure.

FIG. 9 provides a cross-section though aerosol generating chamber 148 when the article is in its assembled form. As can be seen, aerosol generating component 130 is located with aerosol generating chamber 148 which has been formed by flow regulator 140 and second outer housing component 110*b* (or end cap). On the inwardly projecting surface of the second outer housing component 110*b* is an enclosure 149. Enclosure 149 is partly formed by one or more perimeter walls 149*a*. The one or more perimeter walls 149*a* have a perimeter edge 149*b*. This perimeter edge 149*b* contains at least one retention feature 149*c*. The at least one retention feature is configured to align with a corresponding retention feature 147 on flow regulator 140. When flow regulator 140 and second outer housing component 110*b* are brought together, aerosol generating component 130 is sandwiched therebetween. Thus, flow regulator acts as a heater support. The at least one retention feature 149*c* on the perimeter edge 149*b* and the at least one retention feature 147 on flow regulator 140 inter-lock so as to fixedly retain the aerosol generating component 130. The perimeter edge 149*b* has a surface 149*d* which is co-planar with a corresponding forming surface 142 of the flow regulator 140. Due to the co-planar nature of the surface 149*d* and the forming surface 142, the aerosol generating component 130 is biased and retained in that same plane. Thus, by configuring the plane of the respective the surface 149*d* and the forming surface 142 it is possible to influence the shape of the aerosol generating component 130. In this particular embodiment the flow regulator acts as a heater support. However, in other embodiments the heater support may be performed by another component of the article which does not act as a flow regulator.

In one embodiment, the plane formed between the at least one surface of the perimeter edge and the at least one forming surface of the flow regulator is curved. In one embodiment, the plane formed between the at least one surface of the perimeter wall and the at least one forming surface of the flow regulator is convex when viewed from the perspective of the outer housing component. In one embodiment, the plane formed between the at least one surface of the perimeter wall and the at least one forming surface of the flow regulator is concave when viewed from the perspective of the outer housing component.

Figure 10:
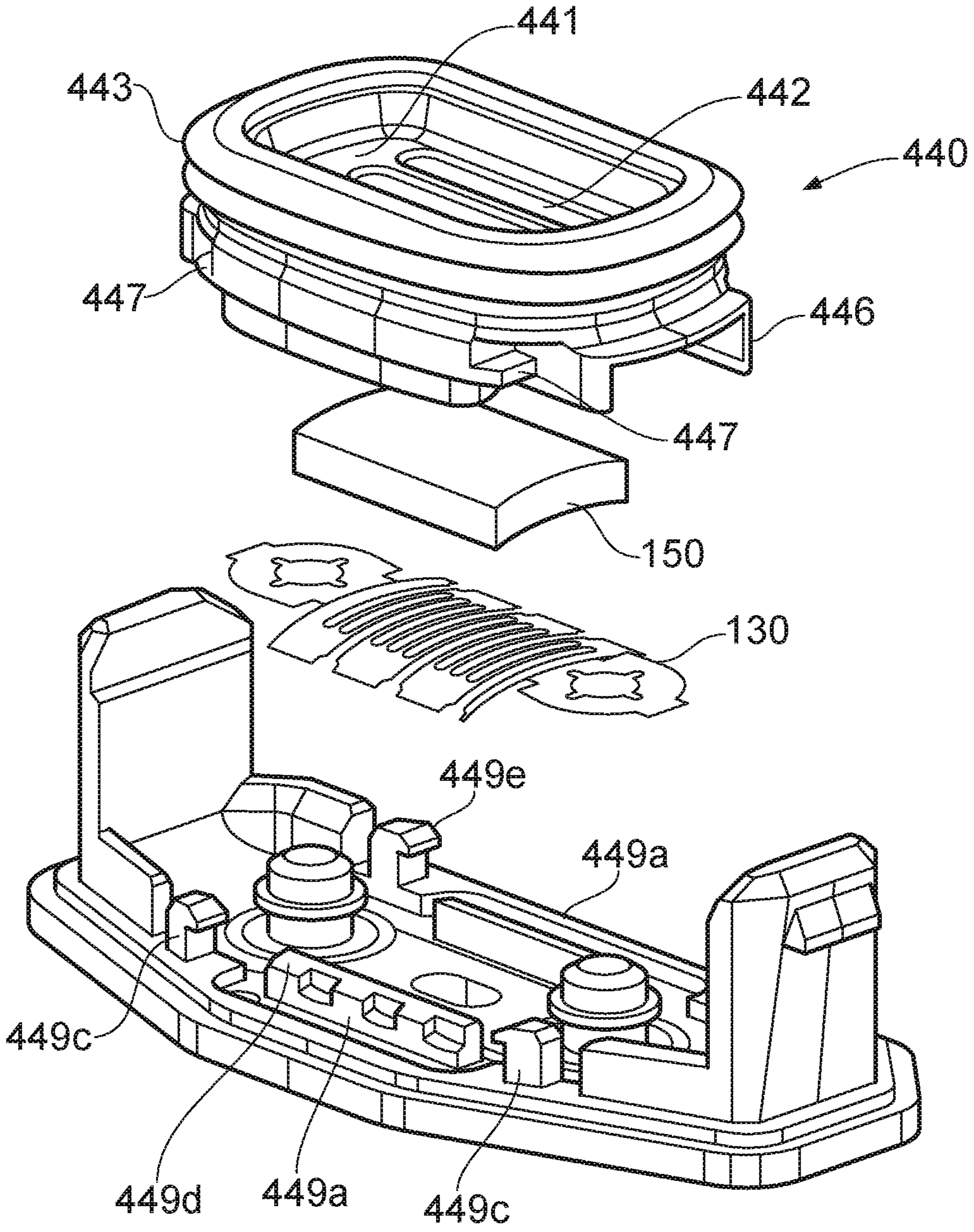
FIG. 10 is an exploded view of a flow regulator and second outer housing component of an article for an aerosol provision device according to the present disclosure.

A further example of the flow regulator and second outer housing component is shown in FIG. 10. In particular, FIG. 10 shows an exploded view of flow regulator 440 and second outer housing component 410*b*. The aerosol generating component 130 and pad 150 are as describe with respect to other examples and will not be further described here.

Flow regulator 440 contains a recess 141 into which open end 122 of the inner housing component 120 can be received (not shown). Recess 441 may contain one or more openings 442 which allow for the flow of aerosolizable material through the flow regulator. Flow regulator 440 also contains an annular seal 443 around its perimeter which serves to inhibit egress of aerosolizable material from the boundary between inner housing component 420 and flow regulator 440. Flow regulator 440 contains at least one retention feature 447 which is configured to interact with a corresponding retention feature 449*c* on the second outer housing component on the second outer housing component 410*b*. In one embodiment, the flow regulator comprises one, two, three, four or more retention features. In one embodiment, the second outer housing component 410*b* comprises a corresponding number of retention features as on the flow regulator. In the example of FIG. 10, the flow regulator comprises four retention features 447 (only two of which are visible). Each of these retention features is a laterally extending tab. When the flow regulator and the second outer housing component 410*b* are brought together, the corresponding retention features 449*c* on the second outer housing component 410*b* inter-lock with the tabs of the retention features 447. In particular, the corresponding retention features 449*c* on the second outer housing component 410*b* contain upstanding teeth with a sloped ridge 449*e* projecting towards the retention features 447. The sloped ridge 449*e* rides over the tab of the corresponding retention feature 447, and then snaps into place once the ridge has cleared the tab, thus locking the second outer housing component 410*b* to the flow regulator 140.

Second outer housing component 410*b* also contains one or more perimeter walls 449*a*. The one or more perimeter walls 449*a* of second outer housing component 410*b* have a forming surface 449*d* (only one of which is visible in FIG. 10). Forming surface 449*d* cooperates with a corresponding forming surface on flow regulator 440 (not visible in FIG. 10) and operates as described earlier with respect to the example of FIG. 9.

Flow regulator 440 also contains a skirt 446 which is received by the second outer housing component 410*b*. Skirt 446 extends laterally from the flow regulator 440 and serves as the outlet of the aerosol generating chamber 448 formed by the coming together of the flow regulator 440 and second outer housing component 410*b*.

As explained above, the article described herein generally comprises at least one, typically two, electrode pins. These are shown as electrode pins 116 in the above mentioned examples. It has been found that improvements in the electrode pins can be made. In particular, the electrode pins of the present disclosure can be configured so as to take a particularly aerodynamic form. For example, there is provided an article for use as part of a non-combustible aerosol provision system, the article comprising an aerosol generating component located at least partially within an aerosol generating chamber, wherein the article further comprises at least one electrode pin extending through the aerosol generating chamber so as to be in contact with the aerosol generating component, wherein at least one region of the outer profile of the electrode pin is configured to increase the aerosol collected matter (ACM) produced by the article.

Figure 11:
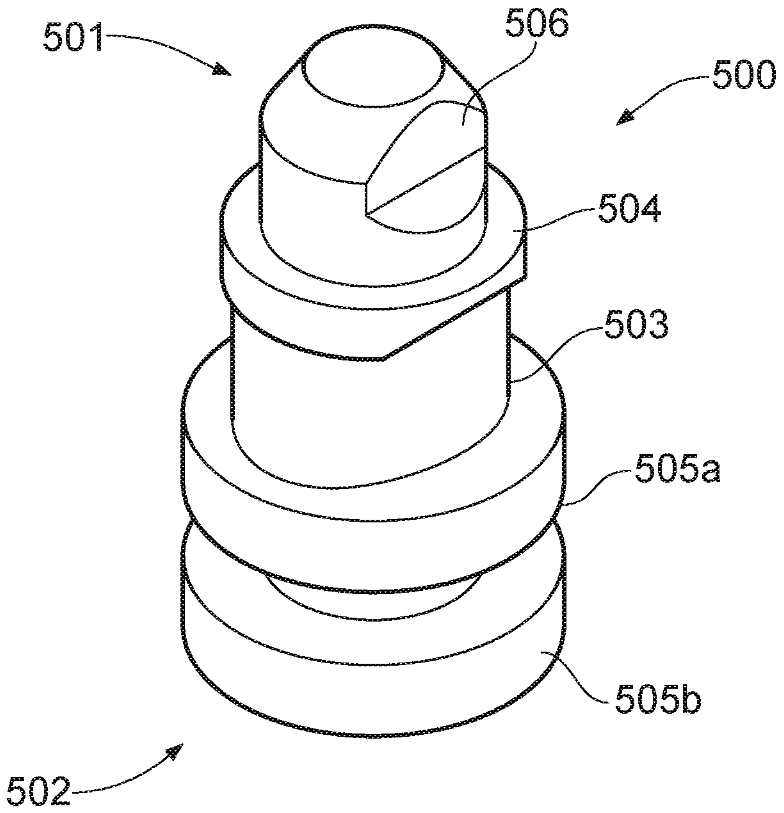
FIG. 11 is an electrode pin according to the present disclosure.

FIG. 11 shows an electrode pin 500 according to the present disclosure which is configured to take an aerodynamic form. It will be appreciated that the below description applies to one or both of the electrode pins within the article.

In particular, electrode pin 500 comprises a first end 501 and a second end 502. Connected the first and second ends is a connecting region 503. The first end 501 is configured to establish a suitable electrical contact with an aerosol generating component (such as aerosol generating component 130 described above). Such contact may result from press-fitting the first end 501 through tab 131 of the aerosol generating component. In some embodiments, the first end 501 of the electrode pin (of any of the embodiments described herein) may contain a collar 504. The collar is configured to interact with the tab 131 of the aerosol generating component 130 so as to improve the resilience of the electrical contact between the pin and the aerosol generating component 130. The second end 502 of the electrode pin also comprises two retaining collars 505*a* and 505*b*. These collars are spaced apart so as to create a receiving space for the wall of the second outer housing component 110*b*. Thus, when the electrode pins are inserted through a suitable aperture in the second outer housing component 110*b*, collars 505*a* and 505*b* span the wall of the second outer housing component 110*b* so as to maintain the electrode pin in place. The interface between the collars 505*a* and 505*b* and the second outer housing component 110*b* may be provided with one or more sealing components in order to prevent or inhibit liquid egress from the aerosol generating chamber 148.

As has been explained above, electrode pins 500 contain a connecting region 503. Connecting region 503 spans the first end 501 and second end 502 of the pin. When the pin is located in the aerosol generating chamber, or in an airflow path of some kind, due to the relatively aerodynamic profile of at least the connecting region, it is possible to increase the aerosol collected matter (ACM) produced by the article relative to the ACM produced by a pin with connecting region having a circular cross section. For example, by configuring at least the connecting region 503 of the pin such that it has a relatively increased aerodynamic profile, it is possible to influence the airflow velocity within the aerosol generating chamber. Without being bound by theory, it is understood that by employing a pin having at least a connecting region shaped so as to have a relatively increased aerodynamic profile it is possible to increase the local velocity of airflow at an upstream side of the pin. This relatively increased velocity contributes to an increase in ACM from the article.

Figure 12A:
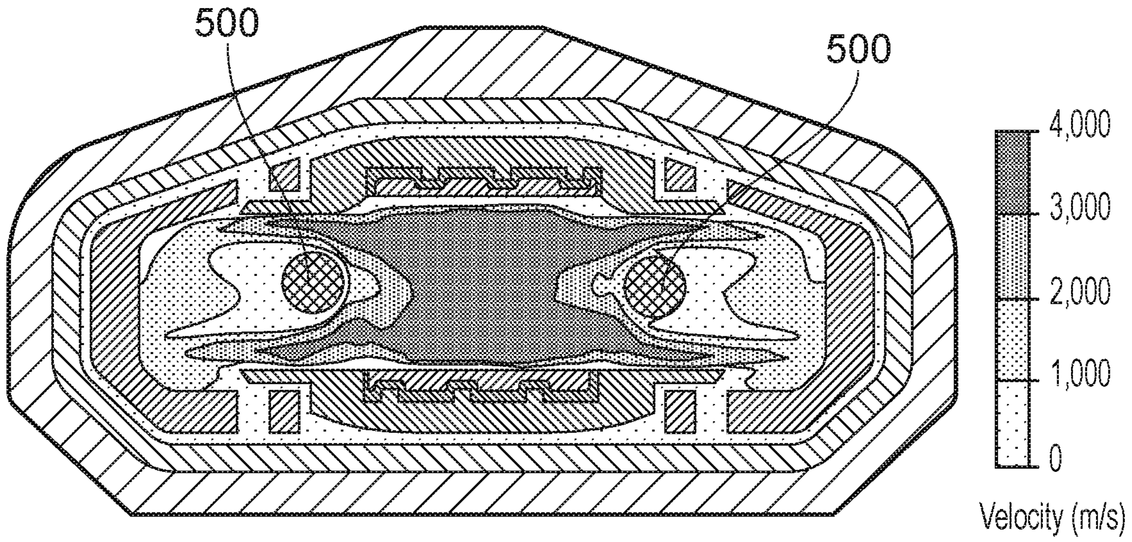
FIG. 12*a* is a representation of the airflow velocity around an article comprising circular electrode pins in accordance with the present disclosure
Figure 12B:
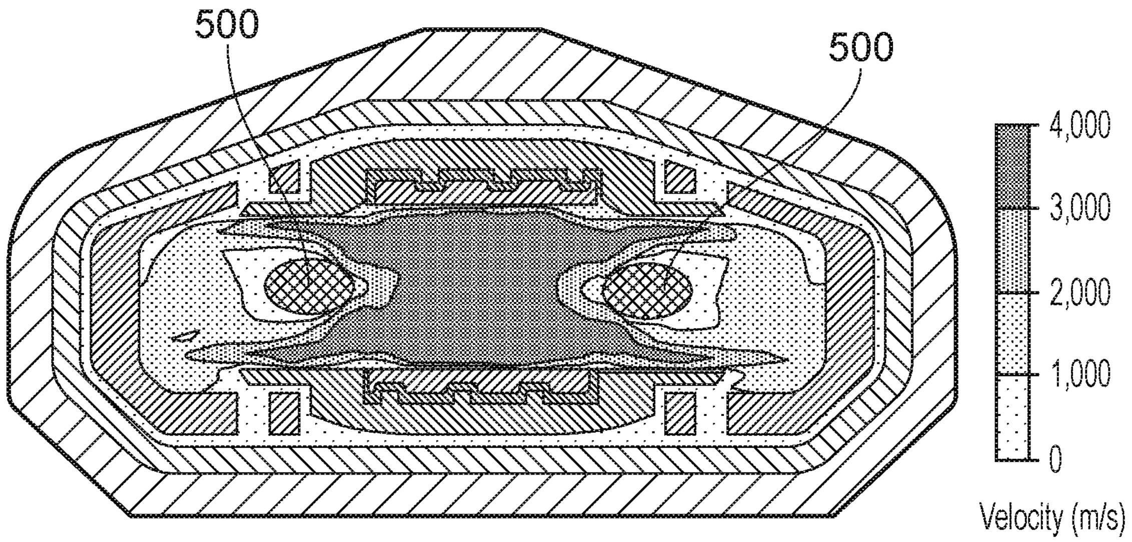
FIG. 12*b* is a representation of the airflow velocity around an article comprising aerodynamically configured electrode pins in accordance with the present disclosure.
Figure 13:
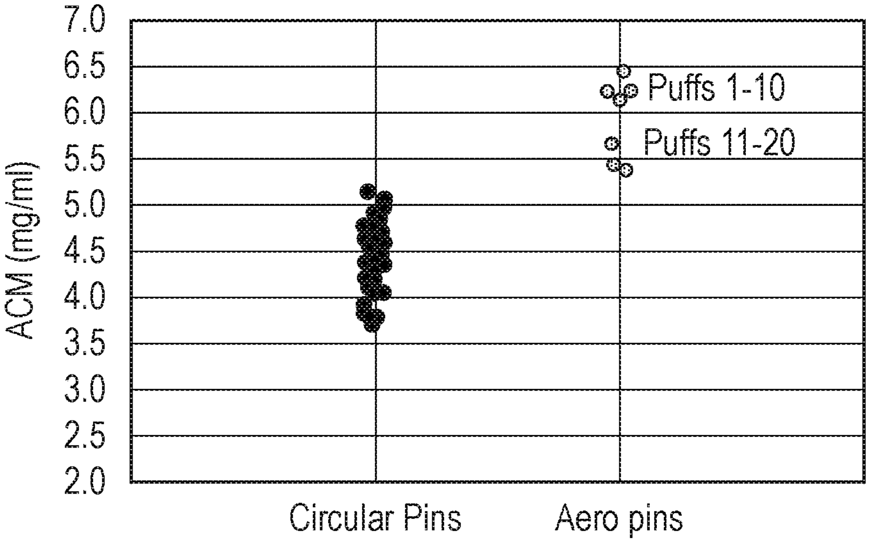
FIG. 13 is a graphical representation of the influence on aerosol collected matter of the article according to FIG. 12*a* and, separately, the article according to FIG. 12*b*.

In this regard, reference can be made to FIG. 12*a* and FIG. 12*b*, as well as FIG. 13. FIG. 12*a* provides a representation of the airflow velocity around circular electrode pins located in an aerosol generating chamber. FIG. 12*b* provides a representation of the airflow velocity around aerodynamically configured electrode pins located in a corresponding aerosol generating chamber. The various shading corresponds to the airflow velocity within the aerosol generating chamber. As can be seen from a comparison of FIGS. 12*a* and 12*b*, where the pins have a connecting region with a circular cross-section the areas of relatively lower velocity extend further around the pins and deeper into the central area of the aerosol generating chamber compared to when the pins have a more aerodynamic configuration. The influence of this on ACM produced by each article is shown in FIG. 13. An article having the circular pin configuration of 12*a* has a lower ACM compared to an article having the aerodynamic pin configuration of FIG. 12*b*.

In the example of FIG. 11, connecting region 503 has an ellipsoid cross-section (when viewed along the longitudinal axis of the pin). By virtue of this cross-section, airflow past the pin is subjected to less turbulence than would be experienced if the pin had a circular cross-section, and the velocity of airflow in the area surrounding the pin and upstream of the pin is generally inhibited less. Other suitable shapes can be used to minimize the turbulence of airflow past the electrode. For example, the connecting region 503 can have a non-circular cross-section, such an oval cross-section, an ellipsoid cross-section, an aerofoil cross-section, a tear-drop cross-section or a polygonal cross-section, when viewed along the longitudinal axis of the pin.

Where the pin has a polygonal cross-section (when viewed along the longitudinal axis of the pin), such as a diamond or oblong, it may be that any corners are rounded in order to smooth the flow of airflow around/over that corner. For example, a connecting region may a cross-section have two parallel edges joined by two rounded edges.

In order to influence the ACM produced by the article, the electrode pin should be oriented within the article such that aerosol passes past the pin. In one embodiment, at least one of the aerodynamically configured electrode pins is located within a portion of the airflow path downstream from a point of aerosol generation. Typically, at least one of the aerodynamically configured electrode pins will be located within the aerosol generating chamber of the article.

In one embodiment, the article comprises two aerodynamically configured electrode pins. Each aerodynamically configured electrode pin may be located within the aerosol generating chamber. Alternatively, one may be located within the aerosol generating chamber and one may be located outside the aerosol generating chamber. Alternatively, both pins may be located outside of the aerosol generating chamber but along the airflow path from the aerosol generating chamber to the one or more outlets of the article. As has been described above, the article need not comprise a single airflow path from the aerosol generating chamber to the one or more outlets, and it may be that each electrode is located in a distinct airflow path.

Since the aerodynamically configured pins are generally non-circular in cross section, during manufacture it is important to align them correctly within the airflow part, such that the most aerodynamically acceptable profile is aligned with the direction of airflow.

In order to assist in the correct positioning of the electrode pin, the pin may contain one or more orienting features which are configured to fit with a corresponding alignment feature elsewhere in the article (for example on the flow regulator). When the article is assembled, the at least one orienting feature, such as notch 506, interacts with the alignment feature so as to rotate the pin 500 into a final position which is the most aerodynamically favorable position. There are other instances, however, where such an orienting feature on the pin can be advantageous even where the pin has a circular cross-sectional profile. For example, it is possible to configure the electrode where the second end (that end of the pin facing the device containing the power source), is shaped in a specific manner. For example, it may be that the electrode pins of the device have a particular shape that requires a corresponding shape of article pins in order for electrical contact to be made. Having article and device pins that have connecting faces that have different orientations can introduce an element of security into the system. For example, where the device pins and article pins are not correctly aligned, current can not be transferred to the aerosol generating component and the system will not be able to operate. By ensuring a specific orientation of article and device pins, it is possible to ensure that only articles with correct article pin orientation can be used. This can be useful to inhibit counterfeit articles which have an incorrect pin configuration from being used.

It will be appreciated that in either of the above cases, the specific shape of the pin (be it the aerodynamically configured section, or the device facing contact section) must be considered alongside the orientation of that shape. Thus, ensuring correct orientation of the one or more electrodes is important. Accordingly, in one aspect there is provided an electrode pin comprising one or more orientating features which serve to orientate the electrode pin in a specific rotational configuration when mated with one or more alignment features of a corresponding component. In one embodiment, the at least one orientating feature is a notch, or a rib. The one or more notches or ribs may be configured to fit with a corresponding alignment feature on a heater support within the article, such that the orientating feature can only mate with the alignment feature in a specific rotational configuration. One of the notch or the rib may display to a tapered profile which facilitates engagement with the alignment feature.

There is further provided an aerosol provision system comprising a device having a first pair of electrodes each having a connecting face, and an article having a second pair of electrodes each having a connecting face configured to mate with a corresponding connecting face of the first pair of electrodes, wherein the cross-section of a connecting face of at least one of the electrodes is different to that of another one of the electrodes.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure as defined by the claims or limitations on equivalents to the claims, and that other embodiments may be utilized and modifications may be made without departing from the scope of the claimed disclosure. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An article for use as part of a non-combustible aerosol provision system, the article comprising:

a housing; and a substantially planar aerosol generating component, wherein the housing comprises a plurality of air inlets disposed within a first plane at a first end, wherein the aerosol generating component forms a second plane, wherein the plurality of air inlets are entirely within a perimeter defined by the aerosol generating component when viewed along an axis perpendicular to the first plane, wherein the heater comprises a heated section defined by a temperature perimeter of within 10% of a part of the heater with a highest temperature, wherein the heated section comprises multiple parallel filament sections which are separated by corresponding parallel spaces, wherein the airflow inlets are located within the temperature perimeter of the heated section.

2. The article according to claim 1, wherein the first end of the housing comprises an outer housing component.

3. The article according to claim 2, wherein the plurality of air inlets is located in the outer housing component.

4. The article according to claim 3, wherein each air inlet of the plurality of air inlets extends from an outside of the article directly into an aerosol generating chamber.

5. The article according to claim 4, wherein the aerosol generating chamber is formed by an inwardly facing surface of the outer housing component and a flow component.

6. The article according to claim 5, wherein the aerosol generating component is located within the aerosol generating chamber.

7. The article according to claim 1, wherein the plurality of air inlets comprises one of: two air inlets, three air inlets, four air inlets, five air inlets, six air inlets, seven air inlets, or eight air inlets.

8. The article according to claim 1, wherein the aerosol generating component is an electrically resistive heater.

9. The article according to claim 1, wherein the plurality of air inlets comprises one of: two air inlets, three air inlets, four air inlets, five air inlets, and six air inlets, and wherein each air inlet is configured as would be found on a die.

10. The article according to claim 1, wherein each air inlet in the plurality of air inlets comprises of an opening, a neck section and an outlet.

11. The article according to claim 10, wherein the opening and the outlet of each individual air inlet of the plurality of air inlets are a same shape as another individual air inlet of the plurality of air inlets.

12. The article according to claim 10, wherein the opening and the outlet of each individual air inlet of the plurality of air inlets are of a different shape as another individual air inlet of the plurality of air inlets.

13. The article according to claim 10, wherein the opening and the outlet of each individual air inlet of the plurality of air inlets have the same dimensions as another individual air inlet of the plurality of air inlets.

14. The article according to claim 10, wherein the opening and the outlet of each individual air inlet of the plurality of air inlets have different dimensions compared to another individual air inlet of the plurality of air inlets.

15. A non-combustible aerosol provision system comprising the article of claim 1 and a device comprising a power source and a control unit.

16. A non-combustible aerosol provision system according to claim 15, wherein the device and the article are separably connected.

17. A non-combustible aerosol provision system according to claim 15, wherein the device and the article are permanently connected.

* * * * *